United States Patent [19]

Mizuno et al.

[11] 4,170,153
[45] Oct. 9, 1979

[54] HYDROMECHANICAL TRANSMISSION

[75] Inventors: Kiyohumi Mizuno, Nagoya; Hiroaki Maeda, Toyota; Shigeo Takahashi, Chiryu, all of Japan

[73] Assignee: Aisin Seiki Kabushiki Kaisha, Aichi, Japan

[21] Appl. No.: 787,931

[22] Filed: Apr. 15, 1977

[30] Foreign Application Priority Data

Apr. 15, 1976 [JP] Japan .................. 51-42776
May 28, 1976 [JP] Japan .................. 51-625977

[51] Int. Cl.² .................. B60K 21/00; B60K 41/04
[52] U.S. Cl. .................. 74/868; 74/867; 74/865; 74/864; 74/863
[58] Field of Search .................. 74/863, 864, 865, 867, 74/868, 869

[56] References Cited

U.S. PATENT DOCUMENTS

| | | | |
|---|---|---|---|
| 3,022,676 | 2/1962 | Duffy | 74/868 |
| 3,546,973 | 12/1970 | Ohie | 74/868 |
| 3,683,721 | 8/1972 | Uozumi | 74/868 |
| 3,707,890 | 1/1973 | Ito | 74/868 |
| 3,709,067 | 1/1973 | Ito | 74/864 |
| 3,728,915 | 4/1973 | Clark | 74/868 |
| 3,733,931 | 5/1973 | Nyman | 74/868 |
| 3,738,198 | 6/1973 | Kell | 74/868 |
| 3,842,694 | 10/1974 | Marlow | 74/867 |
| 3,902,380 | 9/1975 | Murakami | 74/868 |
| 3,949,627 | 4/1976 | Murakami | 74/867 |
| 4,030,381 | 6/1977 | Lalin | 74/867 |
| 4,041,810 | 8/1977 | Harmon | 74/868 |
| 4,043,227 | 8/1977 | Beals | 74/868 |
| 4,082,013 | 4/1978 | Dornfeld | 74/866 |

*Primary Examiner*—Charles J. Myhre
*Assistant Examiner*—R. C. Turner
*Attorney, Agent, or Firm*—Oblon, Fisher, Spivak, McClelland & Maier

[57] ABSTRACT

In a hydromechanical transmission, low and high speed drive power trains are selectively completed in response to variation of the speed ratio between an input shaft and an output shaft. The transmission comprises a speed ratio detecting valve for detecting lower and higher limits of a predetermined speed ratio and a clutch control valve for conducting the switchover between the low and high speed drive power trains with a predetermined time lag after the actual speed ratio reaches a range defined by the lower and higher limits of the predetermined speed ratio.

3 Claims, 18 Drawing Figures

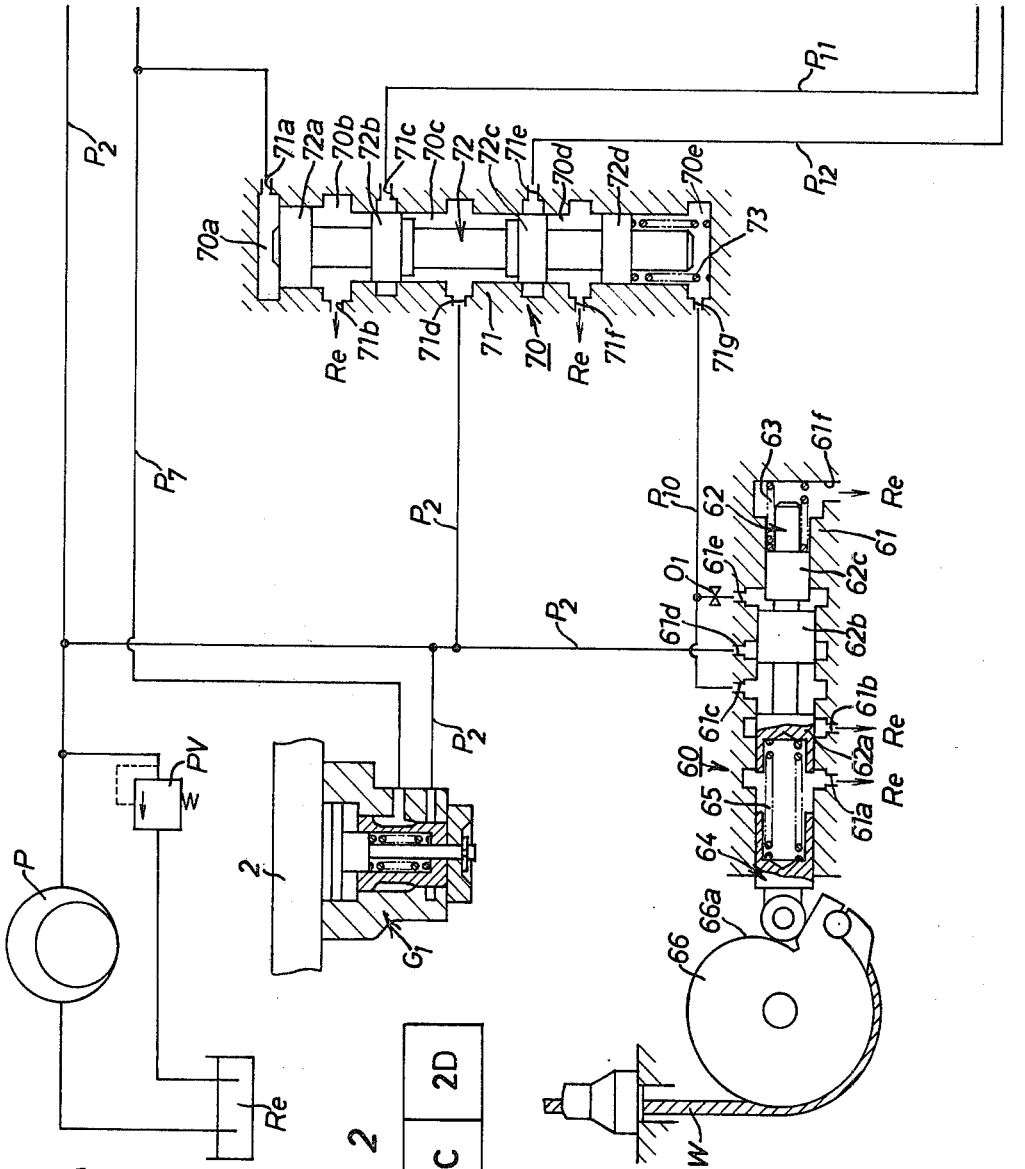
Fig. 2A
| 2A | 2B | 2C | 2D |
Fig. 2
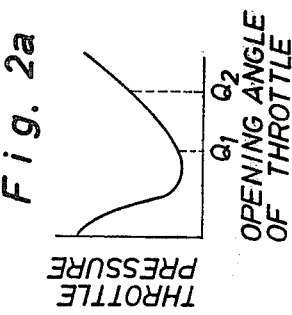
Fig. 2a

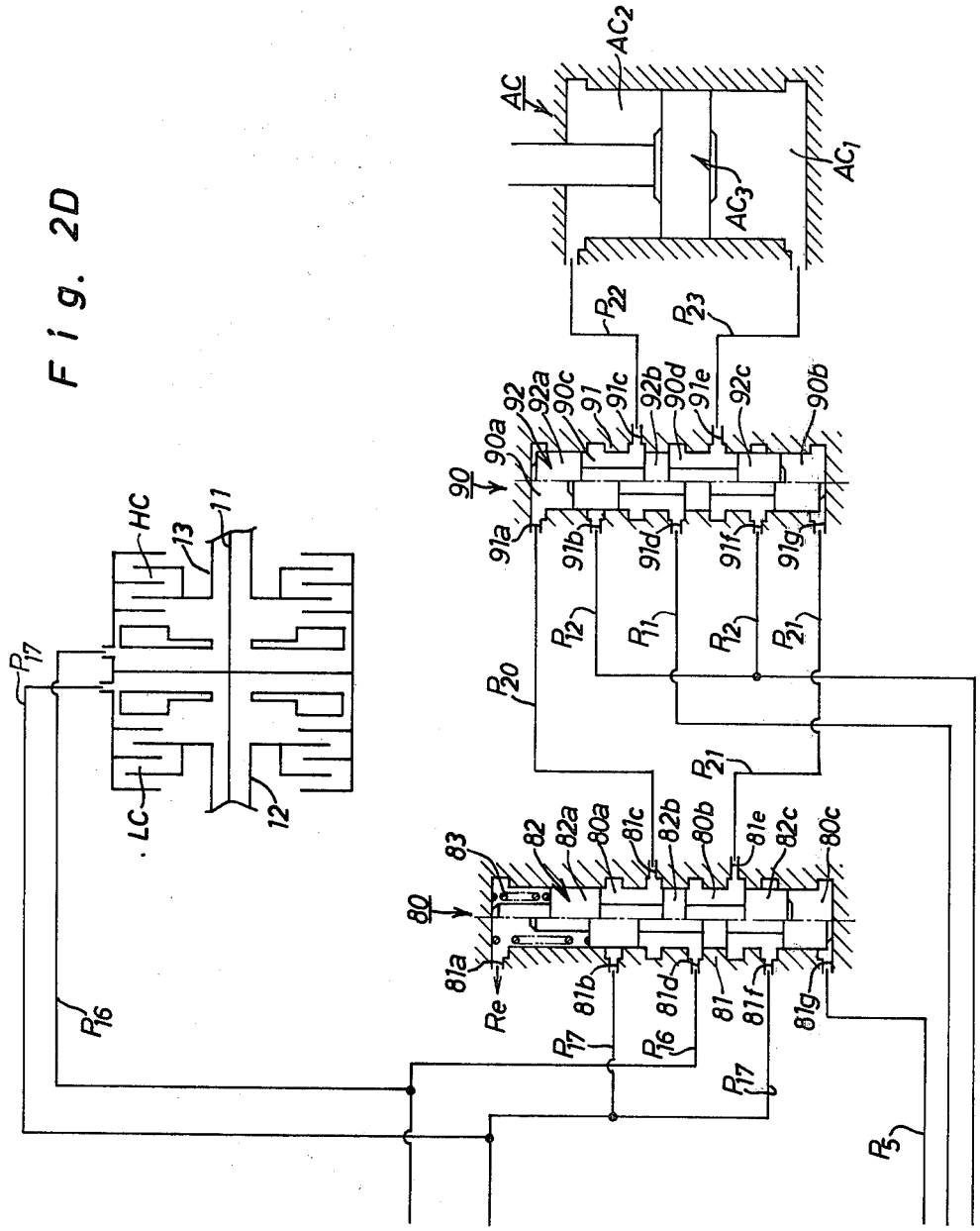

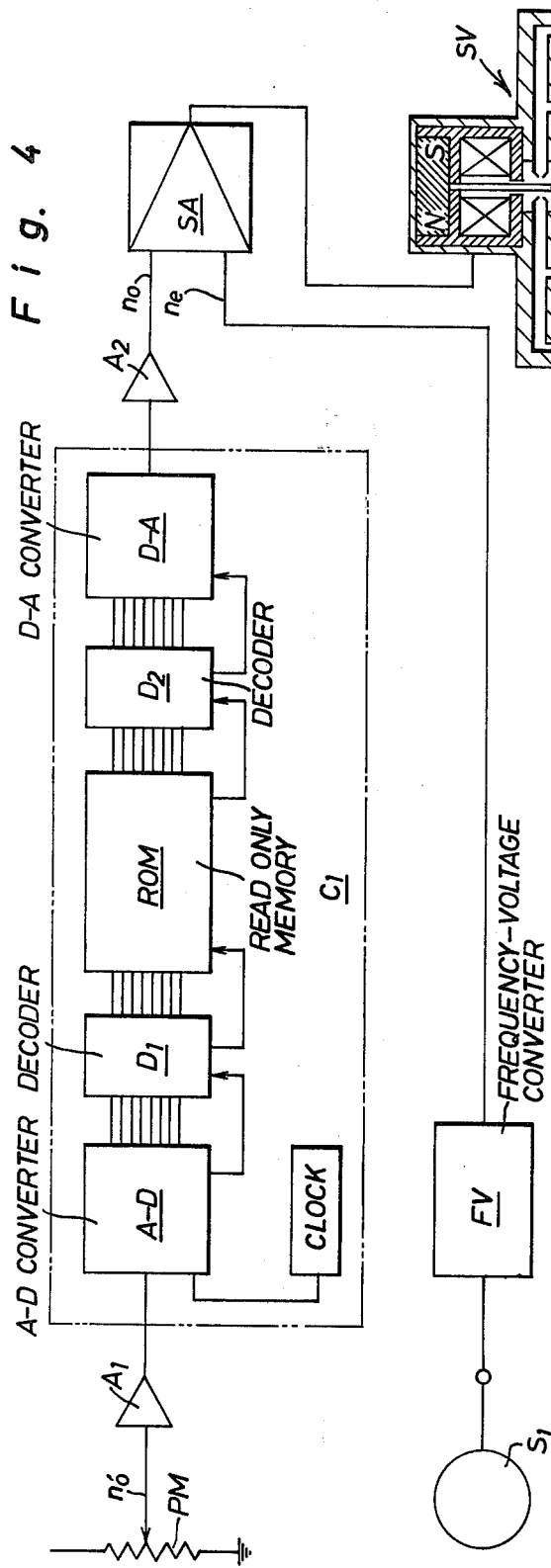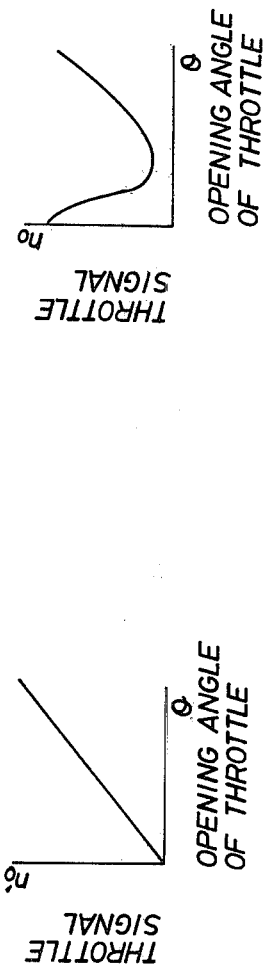

HYDROMECHANICAL TRANSMISSION

BACKGROUND OF THE INVENTION

The present invention relates to hydromechanical transmissions, and more particularly to an improvement of a hydromechanical transmission of the type wherein low and high speed drive power trains are selectively completed in response to variation of the speed ratio between an input shaft and an output shaft.

In conventional hydromechanical transmissions of this kind, the speed ratio of the output shaft against the input shaft is controlled in accordance with variation of the displacement ratio of an adjustable positive displacement pump-motor and the low speed drive power train is switched over to and from the high speed drive power train when the speed ratio reaches a predetermined value. In the pump-motor, however, it is very difficult to eliminate fluid leakage between a cylinder barrel and a valve plate assembled within the pump-motor. Thus, due to the fluid leakage of the pump-motor, the actual speed ratio conducted under control of the pump-motor differs inevitably from the speed ratio figured out in the designing stage. As a result, the switchover between the low and high speed drive power trains may not be surely conducted.

To solve the above-mentioned drawback, in a co-pending U.S. patent application Ser. No. 765,532 filed on Feb. 1, 1977, the inventors have been proposed a hydromechanical transmission wherein speed ratio detecting means is provided to detect lower and higher limits of a predetermined speed ratio and clutch control means is provided to selectively operate the low and high speed range clutches in a range defined by the lower and higher limits of the predetermined speed ratio so as to surely conduct the switchover between the low and high speed drive power trains. In the hydromechanical transmission mentioned above, it is, however, experienced that the low and high range clutches are frequently engaged and disengaged when the actual speed ratio reaches in the predetermined range described above. This causes unpleasant drive feeling and unnecessary wearing of the clutches.

SUMMARY OF THE INVENTION

Accordingly, the present invention is directed to solve the above-mentioned problem and to provide an improved hydromechanical transmission, wherein the engagement of the low or high range clutch is conducted with a predetermined time lag after the actual speed ratio reaches in the predetermined range.

In a preferred embodiment of the present invention, there is provided a hydromechanical transmission which comprises
an input shaft;
an output shaft;
a hydraulically controlled differential gear unit for selectively providing low and high speed drive power trains between the input and output shafts;
a first positive displacement pump-motor drivingly connected to the input or output shaft;
a second positive displacement pump-motor hydraulically connected with the first pump-motor;
low and high speed range clutch means for switching-over the low speed drive power train to and from the high speed drive power train in accordance with variation of the displacement ratio of the first or second pump-motor;
speed ratio detecting means for detecting lower and higher limits of a predetermined speed ratio of the output shaft against the input shaft; and
clutch control means for selectively engaging the low and high speed range clutch means with a predetermined time lag after the actual speed ratio reaches in a range defined by the lower and higher limits of the predetermined speed ratio.

BRIEF DESCRIPTION OF THE DRAWINGS

Additional objects and advantages of the present invention will be more readily apparent from the following detailed description of preferred embodiments thereof when taken together with the accompanying drawings in which:

FIG. 2 is a diagram indicating the relative positions of separated portions of a hydraulic control system drawn in FIGS. 2A, 2B, 2C and 2D, FIG. 2a showing a relation between opening angle of a throttle and throttle pressure;

FIGS. 2A, 2B, 2C and 2D show individually in detail the important portions of the hydraulic control system, when these figures are arranged in the corresponding positions as shown in FIG. 2, a detailed complete view of the hydraulic control system for the transmission shown in FIG. 1 may be formed up;

FIG. 4 illustrates a block diagram of an electric control system for a modification of the present invention, FIG. 4 including FIGS. 4A and 4B which illustrate throttle signals varing in accordance with opening angle of a throttle;

DESCRIPTION OF THE PREFERRED EMBODIMENTS

Figure 1:
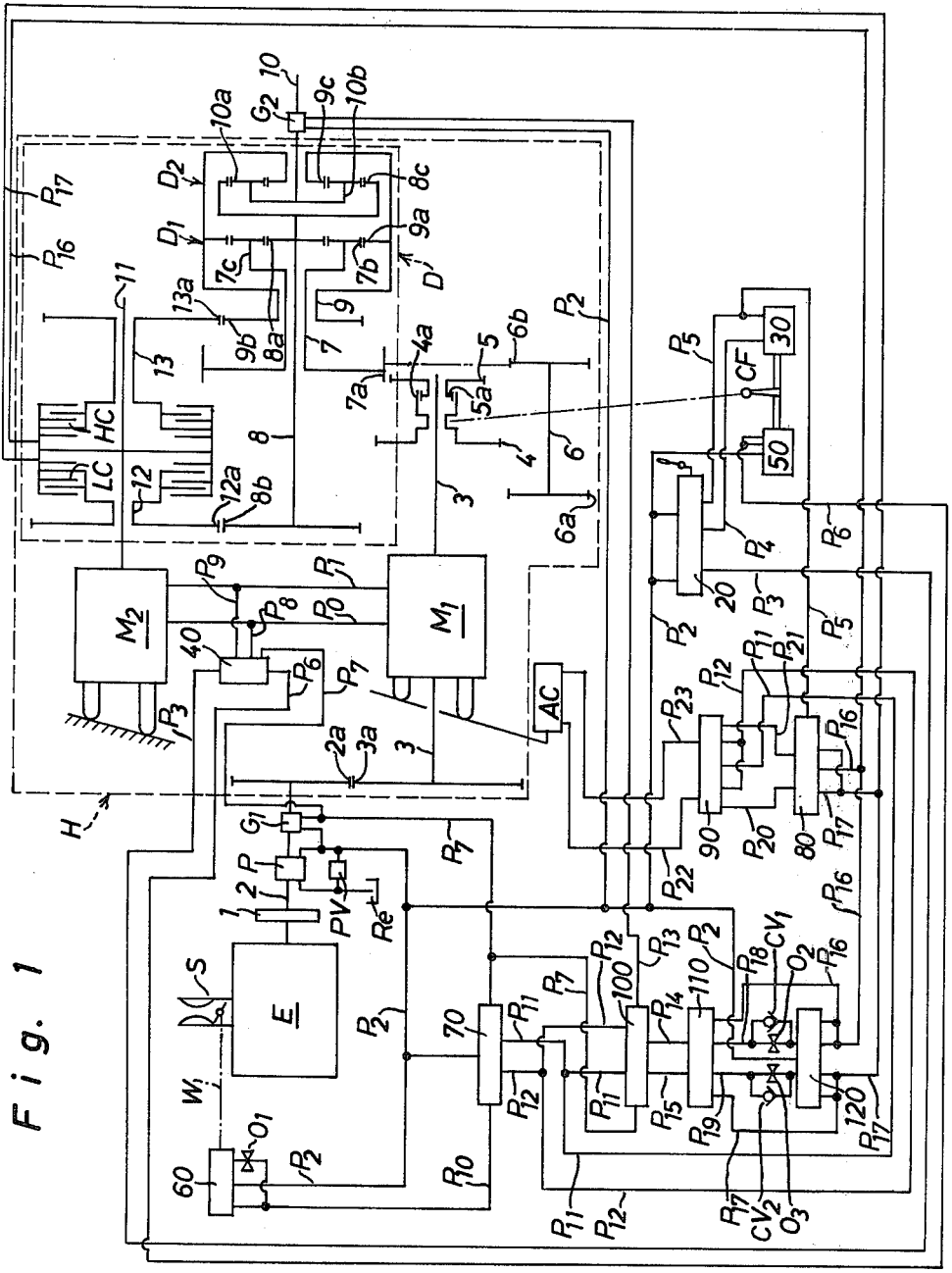
FIG. 1 is a schematic skeleton view showing the whole construction of a hydromechanical transmission in accordance with the present invention.

Referring now to the drawings, particularly in FIG. 1 there is schematically illustrated a preferred embodiment of a hydromechanical transmission in accordance with the present invention. A vehicle engine E is drivingly connected to an input shaft 2 of a hydromechanical transmission H by way of a flywheel 1. Mounted on the transmission input shaft 2 is a fluid pump P for generating line pressure under control of a relief valve PV. A gear 2a fixed on the input shaft 2 is meshed with a gear 3a which is fixed on a driving shaft 3 of a first positive displacement pump-motor $M_1$ of the variable type. A gear 4 is axially slidably splined on the driving shaft 3 and has a dog gear 4a at the right-hand thereof. This gear 4 is moved rightward or leftward by a selector lever CF such that the gear 4 is engaged with a dog gear 5a of a gear 5 at the rightward stroke end thereof and engaged with a left gear 6a fixed on a counter shaft 6 at the leftward stroke end thereof. The gear 5 is journalled on the driving shaft 3 and constantly meshed with a gear 7a of an intermediate shaft 7 which is an input member of a differential gear unit D. A right gear 6b fixed on the counter shaft 6 is also meshed with the gear 7a.

The differential gear unit D comprises first and second planetary gear sets $D_1$ and $D_2$. In the first planetary gear set $D_1$, a sun gear 8a is fixed on a first reaction shaft 8 which has at its left end a gear 8b in mesh with an output gear 12a of a low speed range clutch LC and at its right end a ring gear 8c of the second planetary gear set $D_2$. A ring gear 9a of the first planetary gear set $D_1$ is integrally connected with a second reaction shaft 9 which is rotatably disposed in surrounding relationship to the intermediate shaft 7. The second reaction shaft 9 has at its left end a gear 9b in mesh with an output gear 13a of a high speed range clutch HC and at its right end a sun gear 9c of the second planetary gear set $D_2$. A planetary gear 7b of the first planetary gear set $D_1$ is journalled by a carrier member 7c which is connected to the intermediate shaft 7 rotatable on the first reaction shaft 8. A planetary gear 10a of the second planetary gear set $D_2$ is journalled by a carrier member 10b which is connected to an output shaft 10.

A second positive displacement pump-motor $M_2$ of the fixed type is hydraulically connected to the first pump-motor $M_1$ by way of fluid circuits $P_0$ and $P_1$. The low and high speed range clutches LC and HC are mounted on a rotary shaft 11 of the second pump-motor $M_2$. The low speed range clutch LC includes an output shaft 12 which is rotatably journalled on the rotary shaft 11. When the low range clutch LC is engaged due to hydraulic pressure applied from a fluid circuit $P_{17}$, the output shaft 12 is drivingly connected to the rotary shaft 11. The high speed range clutch HC includes an output shaft 13 which is journalled on the rotary shaft 11. When the high range clutch HC is engaged due to hydraulic pressure applied from a fluid circuit $P_{16}$, the output shaft 13 is drivingly connected to the rotary shaft 11.

Figure 3:
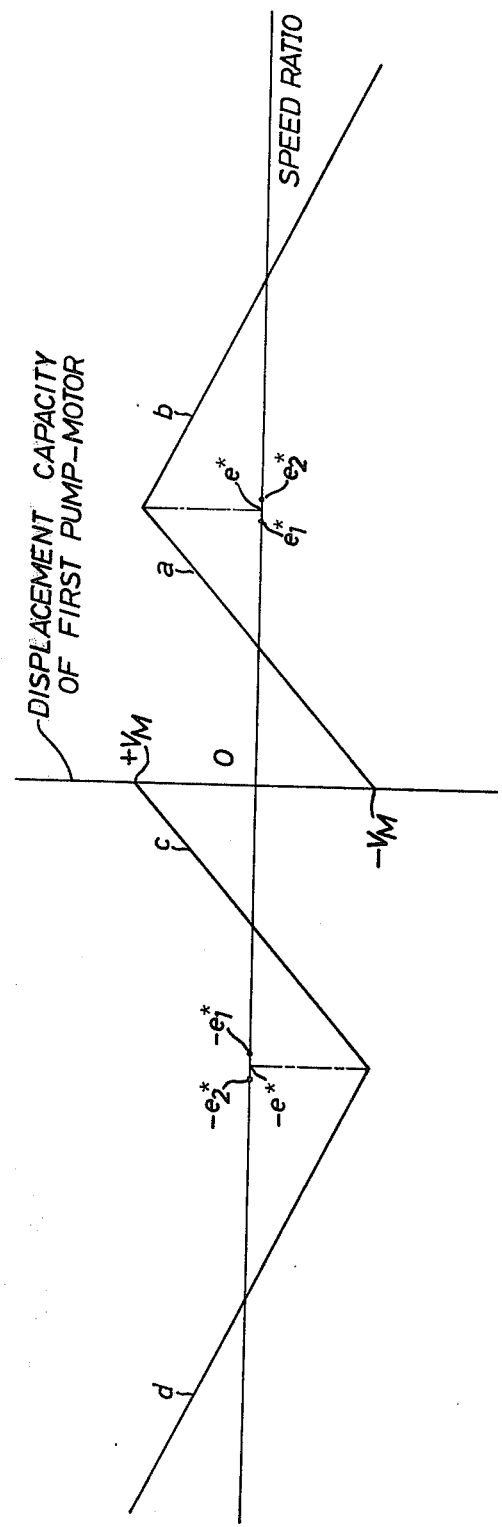
FIG. 3 is a graph chart illustrating variation of the speed ratio conducted in the transmission.

In FIG. 3, taking into consideration fluid leakage in the first and second pump-motors $M_1$ and $M_2$, a relation between the displacement capacity V of the first pump-motor $M_1$ and the speed ratio e of the output shaft 10 against the input shaft 2 is indicated with characteristic lines a, b, c and d. In other words, the characteristic lines a and c represent the changes of the speed ratio e in relation to the changes of the displacement capacity V when the low speed range clutch is engaged to complete a low speed ratio drive power train respectively in forward and rearward drives of the vehicle. On the other hand, the characteristic lines b and d represent the changes of the speed ratio e in relation to the changes of the displacement capacity V when the high speed range clutch is engaged to complete a high speed ratio drive power train respectively in forward and rearward drives of the vehicle.

Figure 2B:
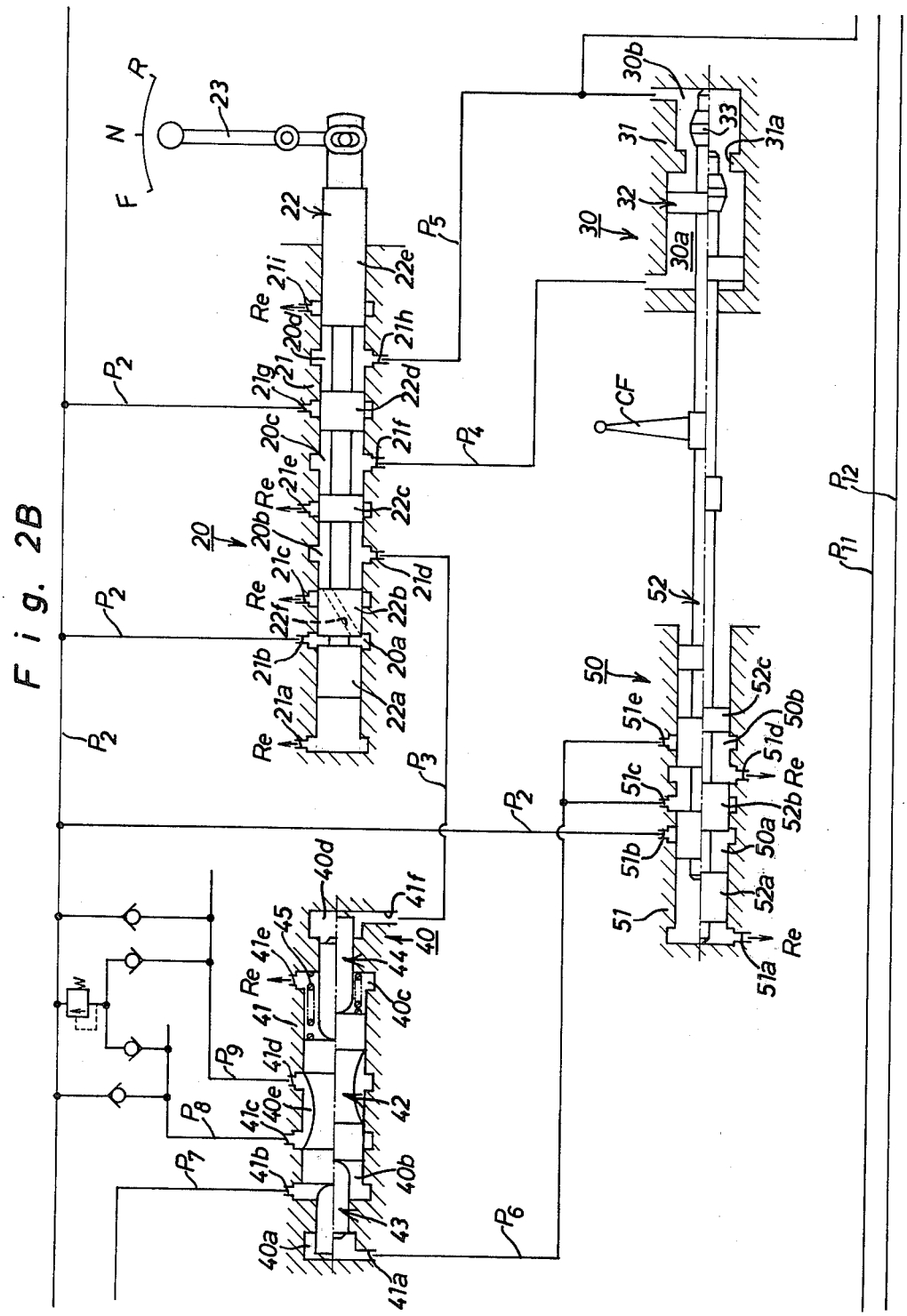
Figure 2C:
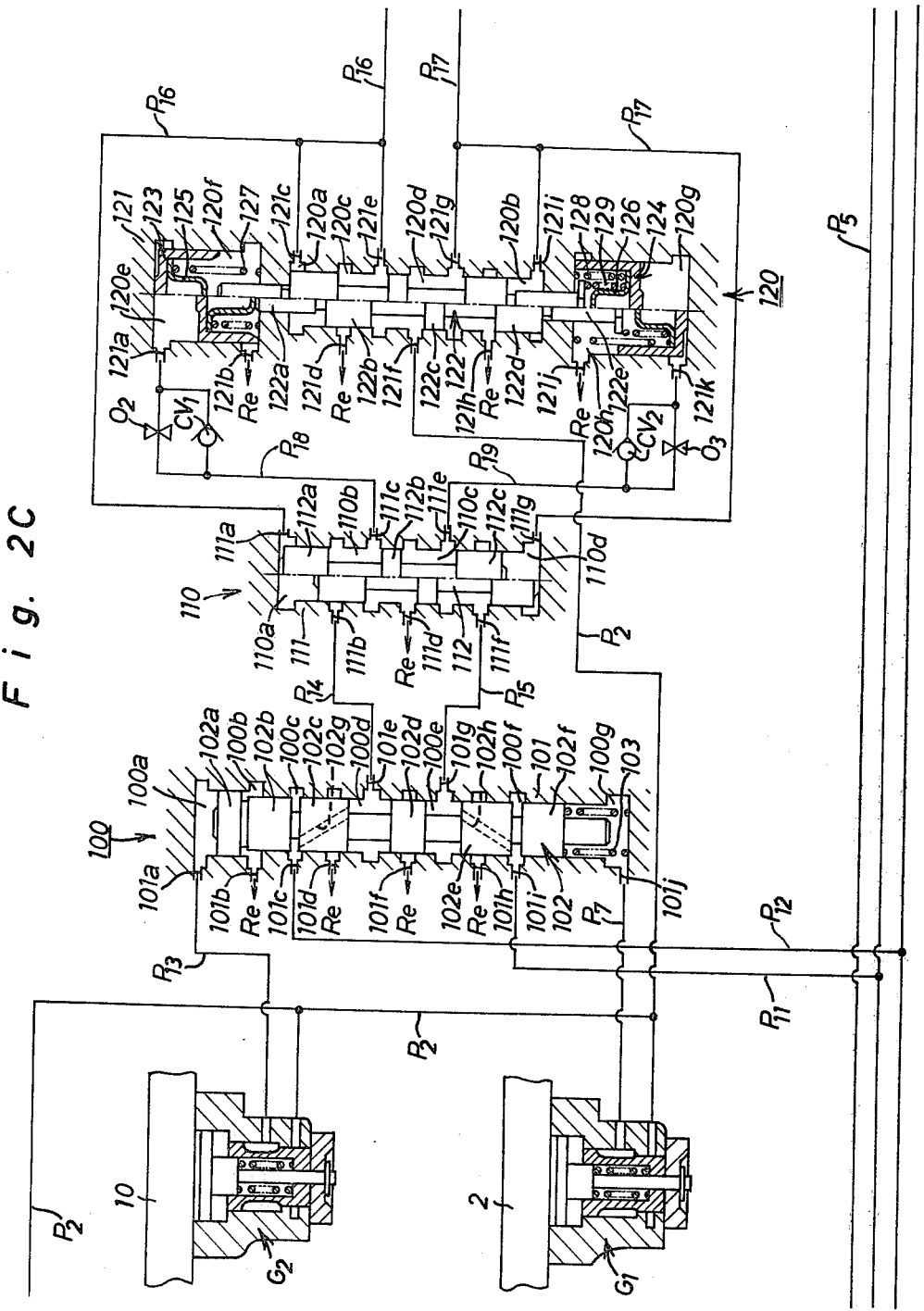

Hereinafter, a hydraulic control system for the hydromechanical transmission H will be described with reference to FIGS. 1 and 2. In FIG. 2 there is illustrated a diagram indicating the relationship of separated portions of the hydraulic control system shown in FIGS. 2A, 2B, 2C and 2D. Particularly with reference to FIG. 2B, a manual shift valve 20 comprises a housing 21, a spool 22 reciprocable within the housing 21 and a shift lever 23 to operate the spool 22, the housing 21 being provided thereon with nine ports 21a to 21i, inclusive. The second and seventh ports 21b and 21g of the housing 21 are connected to the fluid pump P by way of a fluid circuit $P_2$ and the fourth port 21d is connected to a sixth port 41f of a bypass valve 40 by way of a fluid circuit $P_3$. The sixth port 21f of the housing 21 is connected to a left chamber 30a of a fluid cylinder 30, which operates the selector lever CF mentioned above, by way of a fluid circuit $P_4$ and the eighth port 21h is connected to a right chamber 30b of the cylinder 30 by way of a fluid circuit $P_5$ and also to a seventh port 81g of a switching valve 80 which is illustrated in FIG. 2D. The spool 22 is provided thereon with five lands 22a 22e, inclusive, which form four annular chambers 20a to 20d within the housing 21. A passage 22f is drilled through the land 22b of the spool 22 to communicate the first chamber 20a with the second chamber 20b.

The shift lever 23 is connected at its lower end with the outer end of the spool 22 to be selectively positioned in its forward, neutral or reverse position F, N or R. While the shift lever 23 is positioned in its neutral position N, as shown in the figure, the fluid circuit $P_2$ opening to the second port 21b is connected to the fourth port 21d across the first chamber 20a, the passage 22f and the second chamber 20b, whereas the fluid circuit $P_2$ opening to the seventh port 21g is closed by the land 22d. When the shift lever 23 is positioned in its forward position F, the fluid circuit $P_2$ opening to the second port 21b is closed by the land 22a and the fluid circuit $P_3$ is connected to a reservoir Re across the port 21d, the second chamber 20b and the port 21e. In this instance, the fluid circuit $P_2$ opening to the seventh port 21g is connected to the fluid circuit $P_4$ across the third chamber 20c and the sixth port 21f and then the fluid circuit $P_5$ is connected to the reservoir Re through the port 21h, the fourth chamber 20d and the port 21i. Furthermore, when the shift lever 23 is positioned in its reverse position R, the fluid circuit $P_2$ to the second port 21b is closed by the land 22b and the fluid circuit $P_3$ is connected to the reservoir Re across the port 21d, the second chamber 20b and the port 21c. In this instance, the fluid circuit $P_2$ to the seventh port 21g is connected to the fluid circuit $P_5$ across the fourth chamber 20d and the port 21h and then the fluid circuit $P_4$ is connected to the reservoir Re across the port 21f, the third chamber 20c and the port 21e.

The fluid cylinder 30 has a piston 32 which is fixed on an operation rod 52 of a control valve 50. The piston 32 subdivides the interior of a housing 31 into the left and right chambers 30a and 30b which are connected to the fluid circuits $P_4$ and $P_5$ respectively. Provided within the right chamber 30b is an annular boss 31a projected from the inner wall of the housing 31. This annular boss 31a acts to reduce the moving speed of the operation rod 52 when a head 33 of the operation rod 52 passes through the annular boss 31a.

The bypass valve 40 comprises a housing 41, a spool 42 movable within the housing 41 and a pair of pistons 43 and 44 facing to the opposite ends of the spool 42. Within the housing 41, first and fourth chambers 40a and 40d are formed by the pistons 43 and 44 and also second, third and fifth chambers 40b, 40c and 40e are formed by the spool 42. The first chamber 40a is connected through a port 41a to a fluid circuit $P_6$ which is connected to ports 51c and 51e of the control valve 50. The second chamber 40b is connected through a port 41b to a fluid circuit $P_7$ which is connected to a governor valve $G_1$ on the input shaft 2, as shown in FIG. 2A. The third chamber 40c is connected to the reservoir Re through a port 41e and the fourth chamber 40d is connected through the port 41f to the fluid circuit $P_3$ which is connected to the fourth port 21d of the manual shift valve 20. Furthermore, the fifth chamber 40e is connected through ports 41c and 41d to fluid circuits $P_8$ and $P_9$ which are connected to the fluid circuits $P_0$ and $P_1$ respectively, as shown in FIG. 1. With this bypass valve 40, the spool 42 is normally biased leftward in the figure by a compression spring 45 disposed within the third chamber 40c. When the line pressure is applied into the first chamber 40a from the fluid circuit $P_6$, the piston 43 is moved against the spring 45 to displace the spool 42 rightward in the figure so that fluid communication between the fluid circuits $P_8$ and $P_9$ is closed by the spool 42. When the line pressure is applied into the fourth chamber 40d to move the piston 44 leftward, the spool 42 is displaced to open the fluid communication between the fluid circuits $P_8$ and $P_9$, as shown in the figure. In this instance, if the fluid pressure in the second chamber 40b exceeds a predetermined one produced by the governor valve $G_1$ under idling operation of the prime engine E, the spool 42 is returned rightward against loading of the spring 45 so that the fluid communication between the fluid circuits $P_8$ and $P_9$ is closed again.

The control valve 50 comprises a housing 51 and a spool which is integrally formed with the operation rod 52. The housing 51 is provided thereon with five ports 51a to 51e, inclusive, and the spool has three lands 52a to 52c, inclusive. With this control valve 50, when the operation rod 52 is positioned in its leftward stroke end, the second land 52b closes fluid communication between the fluid circuits $P_2$ and $P_6$ respectively connected to the second and third ports 51b and 51c, on the other hand the fluid circuit $P_6$ opening to the fifth port 51e is connected to the reservoir Re through a second chamber 50b between the lands 52b and 52c and the fourth port 51d. When the operation rod 52 is positioned in its rightward stroke end, the first land 52a closes the fluid communication between the fluid circuits $P_2$ and $P_6$, on the other hand the fluid circuit $P_6$ is connected to the reservoir Re through the third port 51c, a first chamber 50a between the lands 52a and 52b and the fourth port 51d. During displacement of the operation rod 52, the fluid communication between the fluid circuits $P_2$ and $P_6$ is temporarily conducted across the first chamber 50a.

Reference is made to FIG. 2A, wherein the governor valve $G_1$ is driven by the transmission input shaft 2. The governor valve $G_1$ controls the line pressure from the fluid circuit $P_2$ in proportion to centrifugal force produced in rotation thereof so that the governor pressure is applied to a first port 71a of a speed responsive valve 70 and the second port 41b of the bypass valve 40 by way of the fluid circuit $P_7$.

A throttle valve 60 comprises a housing 61, a spool 62 and a piston 64 reciprocable within the housing 61, and a cam plate 66 connected to a throttle S of a carburetor for the engine E by way of a wire W. This throttle valve 60 acts to apply into a fluid circuit $P_{10}$ a throttle pressure which is controlled in accordance with opening degree of the throttle S as described later on. The housing 61 is provided thereon with six ports 61a to 61f, inclusive. The first, second and sixth ports 61a, 61b and 61f are connected to the reservoir Re, the third port 61c is connected to a seventh port 71g of the speed responsive valve 70 by way of the fluid circuit $P_{10}$, the fourth port 61d is connected to the fluid circuit $P_2$, and the fifth port 61e is connected through an orifice $O_1$ to the fluid circuit $P_{10}$. The spool 62 has three lands 62a to 62c and is normally biased leftward in the figure by a compression spring 63. The piston 64 is resiliently engaged at the right end thereof with the spool 62 through a compression spring 65 and engaged at the left end thereof with a cam face 66a of the cam plate 66 in such a manner that the piston 64 is axially pushed by the cam face 66a of the cam plate 66.

With this throttle valve 60, the throttle pressure applied into the fluid circuit $P_{10}$ is controlled in relation to the opening degree of the throttle S as shown in FIG. 2a. That is to say, while the throttling degree $\theta$ takes a small figure, the throttle pressure takes a high figure so that engine braking operation is surely conducted. When the throttling degree $\theta$ takes other figures, the throttle pressure is controlled to correspond with the governor pressure which is produced by the governor valve $G_1$ under an engine rotation to generate the maximum power of the engine E.

The speed responsive valve 70 comprises a housing 71 having seven ports 71a to 71g, a spool 72 having four lands 72a to 72d and a compression spring 73 having a predetermined load. In this speed responsive valve 70, a pair of pressure chambers 70a and 70e are formed at the opposite ends of the spool 72 and three annular chambers 70b to 70d are formed by the respective lands 72a to 72d of the spool 72. Thus, the upper pressure chamber 70a is connected to the governor valve $G_1$ by way of the first port 71a and the fluid circuit $P_7$, while the lower pressure chamber 70e is connected to the throttle valve 60 by way of the seventh port 71g and the fluid circuit $P_{10}$. Moreover, the third and fifth ports 71c and 71e are respectively connected to fluid circuits $P_{11}$ and $P_{12}$, the fourth port 71d is connected to the fluid pump P by way of the fluid circuit $P_2$, and the second and sixth ports 71b and 71f are connected to the reservoir Re.

With this speed responsive valve 70, when the engine E is driven at its idling speed or at a speed lower than a predetermined speed defined by movement of the throttle valve 60, the governor pressure in the upper chamber 70a becomes smaller than the throttle pressure in the lower chamber 70e. This moves the spool 72 upward to connect the fluid circuit $P_2$ to the fluid circuit $P_{11}$ and connect the fluid circuit $P_{12}$ to the reservoir Re. When the engine E is driven at the predetermined speed defined by movement of the throttle valve 60, the spool 72 is held in the position shown in the figure so that the fluid circuit $P_2$ is isolated from the fluid circuits $P_{11}$ and $P_{12}$ by means of the lands 72b and 72c of the spool 72. Meanwhile, if the engine E is driven at a speed higher than the predetermined speed defined by movement of the throttle valve 60, the governor pressure becomes larger than the throttle pressure to move the spool 72 downward so that the fluid circuit $P_2$ is connected to the fluid circuit $P_{12}$ and the fluid circuit $P_{11}$ is connected to the reservoir Re.

Now reference is made to FIG. 2C of FIG. 2, wherein a speed ratio detecting valve 100 comprises a spool 102 reciprocable within a housing 101 and a compression spring 103 having a predetermined load. The housing 101 is provided thereon with ten ports 101a to $101j$, inclusive. The tenth port $101j$ is connected to the governor valve $G_1$ by way of the fluid circuit $P_7$ and the third and ninth ports $101c$ and $101i$ are respectively connected to the fluid circuits $P_{12}$ and $P_{11}$. The first port $101a$ is connected through a fluid circuit $P_{13}$ to a second governor valve $G_2$ which is mounted on the output shaft 10. The fifth and seventh ports $101e$ and $101g$ are respectively connected to fluid circuits $P_{14}$ and $P_{15}$ and the remaining ports $101b$, $101d$, $101f$ and $101h$ are connected to the reservoir Re. The spool 102 has six lands $102a$ to $102f$ and is engaged at the bottom end thereof with the spring 103 which normally urges the spool 102 upward. Within the housing 101, a pair of pressure chambers $100a$ and $100g$ are formed at the opposite ends of the spool 102 and four annular chambers $100c$ to $100f$ are formed by the respective lands $102b$ to $102f$ of the spool 102. Thus, the upper chamber $100a$ is constantly connected to the second governor valve $G_2$ through the fluid circuit $P_{13}$ and the lower chamber $100g$ is constantly communicated with the governor valve $G_1$ through the fluid circuit $P_7$. Moreover, the annular chambers $100c$ and $100d$ are communicated with each other through a passage $102g$ and the chambers $100e$ and $100f$ are also communicated with each other through a passage $102h$.

In this speed ratio detecting valve 100, a communication period of the annular chamber $100c$ against the port $101c$ is substantially as same as that of the annular chamber $100f$ against the port $101i$, the communication period being determined by the axial width of the respective ports $101c$ and $101i$ and the axial width of the respective chambers $100c$ and $100f$. As a result, when the spool 102 is moved due to a difference between two governor pressures appeared in the upper and lower chambers $100a$ and $100g$ as shown in the figure, the chamber $100c$ is communicated with the port $101c$ to connect the fluid circuit $P_{12}$ to the fluid circuit $P_{14}$ and simultaneously the chamber $100f$ is communicated with the port $101i$ to connect the fluid circuit $P_{11}$ to the fluid circuit $P_{15}$. This means the fact that the fluid circuits $P_{11}$ and $P_{12}$ are respectively connected to the fluid circuits $P_{15}$ and $P_{14}$ while the speed ratio e of the output shaft 10 against the input shaft 2 is maintained in a certain range indicated by reference characters $e_1^*$ and $e_2^*$ in FIG. 3, in which a reference character $e^*$ indicates a predetermined speed ratio where the low and high speed range clutches LC and HC are synchronized.

A speed ratio responsive valve 110 is provided to selectively complete a communication between the fluid circuit $P_{14}$ and a fluid circuit $P_{18}$ or between the fluid circuit $P_{15}$ and a fluid circuit $P_{19}$. This valve 110 comprises a spool 112 reciprocable within a housing 111. The housing 111 is provided thereon with seven ports $111a$ to $111g$, inclusive. The first and seventh ports $111a$ and $111g$ are respectively connected to the fluid circuits $p_{16}$ and $P_{17}$ which are connected to the high and low speed range clutches HC and LC respectively. The second and sixth ports $111b$ and $111f$ are respectively connected to the fluid circuits $P_{14}$ and $P_{15}$, whereas the third and fifth ports $111c$ and $111e$ are respectively connected to the fluid circuits $P_{18}$ and $P_{19}$, the fourth port $111d$ being connected to the reservoir Re. The spool 112 has three lands $112a$ to $112c$ and forms a pair of pressure chambers $110a$ and $110d$ at the opposite ends thereof and a pair of annular chambers $110b$ and $110c$ between the lands $112a$ to $112c$. When the spool 112 is displaced downward by pressure applied to the upper pressure chamber $110a$, the communication between the fluid circuits $P_{14}$ and $P_{18}$ is blocked by the first land $112a$, whereas the fluid circuit $P_{15}$ is communicated with the fluid circuit $P_{19}$ across the annular chamber $110c$. In this instance, the fluid circuit $P_{18}$ is connected to the reservoir Re across the annular chamber $110b$. When the spool 112 is displaced upward by pressure applied to the lower pressure chamber $110d$, the communication between the fluid circuits $P_{15}$ and $P_{19}$ is blocked by the third land $112c$, whereas the fluid circuit $P_{14}$ is communicated with the fluid circuit $P_{18}$ across the annular chamber $110b$. In this instance, the fluid circuit $P_{19}$ is connected to the reservoir Re across the annular chamber $110c$.

A clutch control valve 120 is provided to selectively connect the fluid circuit $P_2$ to the fluid circuit $P_{16}$ or $P_{17}$ so as to apply the line pressure from the fluid pump P to the high speed range clutch HC or the low speed range clutch LC. This clutch control valve 120 comprises a housing 121, a pair of pistons 123 and 124, a pair of retainers 125 and 126, and three compression springs 127, 128 and 129. The housing 121 is provided thereon with eleven ports $121a$ to $121k$, inclusive. The first port $121a$ and the eleventh port $121k$ are respectively connected to the fluid circuits $P_{18}$ and $P_{19}$. The third and fifth ports $121c$ and $121e$ are connected to the fluid circuit $P_{16}$ and the seventh and ninth ports $121g$ and $121i$ are connected to the fluid circuit $P_{17}$. The sixth port $121f$ is also connected to the fluid circuit $P_2$ and the remaining ports $121b$, $121d$, $121h$ and $121j$ are connected to the reservoir Re.

The spool 122 has five lands $122a$ to $122e$, inclusive, and is reciprocably disposed within the housing 121 to form a pair of pressure chambers $120a$ and $120b$ and a pair of annular chambers $120c$ and $120d$. The upper piston 123 is reciprocably disposed within the housing 121 to form an upper pressure chamber $120e$ and a drain chamber $120f$ and is further biased upwardly by the compression spring 127 through the retainer 125. The piston 123 is moved down against biasing of the spring 127 due to fluid pressure applied into the upper pressure chamber $120e$. The lower piston 124 is also reciprocably disposed within the housing 121 to form a lower pressure chamber $120g$ and a drain chamber $120h$ and is biased downwardly by the compression spring 128 through the retainer 126. This piston 124 is moved up against biasing of the spring 128 due to fluid pressure applied into the lower pressure chamber $120g$. Furthermore, the spool 122 is resiliently received by the compression spring 129, one end of which is engaged with the retainer 126 and the other with the bottom end of the spool 122. This clutch control valve 120 is further characterized in that an orifice $O_2$ and a check valve $CV_1$ are disposed within the fluid circuit $P_{18}$ in parallel to each other and that an orifice $O_3$ and a check valve $CV_2$ are disposed within the fluid circuit $P_{19}$.

In operation of the clutch control valve 120, under the inoperative condition of the hydromechanical transmission, the upper and lower pistons 123 and 124 are positioned in their upward and downward stroke ends due to respective biasing forces of the compression springs 127 and 128 so that the spool 122 is held in the upward position by means of the spring 129 to connect the fluid circuit $P_2$ to the fluid circuit $P_{17}$ and to connect the fluid circuit $P_{16}$ to the reservoir Re. In such an initial condition, when the line pressure is applied to the fluid circuit $P_2$ from the fluid pump P, the low range clutch LC is engaged by the line pressure applied from the fluid circuits $P_2$ and $P_{17}$. In this instance, the line pressure is further applied through the fluid circuit $P_{17}$ to the pressure chamber 120b of the valve 120 and to the lower chamber 110d of the speed ratio responsive valve 110 mentioned above. Thus, the spool 122 is remained in the upward position and the spool 112 of the valve 110 is moved upward to connect the lower pressure chamber 120g to the reservoir Re by way of the check valve $CV_2$ of the fluid circuit $P_{19}$.

Subsequently, when the line pressure is applied into the fluid circuit $P_{18}$ from the fluid circuit $P_{14}$ across the speed ratio responsive valve 110 in response to the operation of the speed ratio detecting valve 100, the upper piston 123 is moved down against the springs 127 and 129 due to the line pressure applied to the upper pressure chamber 120e by way of the orifice $O_2$ of the fluid circuit $P_{18}$ with a predetermined time lag. Consequently, the spool 122 is moved down to connect the fluid circuit $P_2$ to the fluid circuit $P_{16}$ and to connect the fluid circuit $P_{17}$ to the reservoir Re so that the high range clutch HC is engaged and the low range clutch LC is disengaged. In this instance, the line pressure applied to the fluid circuit $P_{16}$ is further applied to the pressure chamber 120a of the valve 120 and the upper pressure chamber 110a of the valve 110 such that the spool 122 is held in the downward position and the spool 112 is moved down to connect the upper pressure chamber 120e of the valve 120 to the reservoir Re through the check valve $CV_1$ of the fluid circuit $P_{18}$.

Thereafter, when the line pressure is applied into the fluid circuit $P_{19}$ from the fluid circuit $P_{15}$ in response to the operation of the valve 100, the lower piston 124 is moved upward against the spring 128 due to the line pressure applied into the lower pressure chamber 120g by way of the orifice $O_3$ of the fluid circuit $P_{19}$ with a predetermined time lag and the spool 122 is also returned upward by means of the spring 129 to connect the fluid circuit $P_2$ to the fluid circuit $P_{17}$ and to connect the fluid circuit $P_{16}$ to the reservoir Re. As a result, the low range clutch LC is engaged again and the high range clutch HC is disengaged.

Now reference is made to FIG. 2D of FIG. 2, wherein the switching valve 80 is provided to be operated only when the shift lever 23 of the manual shift valve 20 is moved to the reverse position R. This switching valve 80 comprises a spool 82 reciprocable within a housing 81 and a return spring 83 biasing the spool 82 toward the original position thereof. The housing 81 is provided thereon with seven ports 81a to 81g, inclusive. The second and sixth ports 81b and 81f are connected to the fluid circuit $P_{17}$ and the fourth port 81d is connected to the fluid circuit $P_{16}$. The third and fifth ports 81c and 81e are respectively connected to fluid circuits $P_{20}$ and $P_{21}$ and the seventh port 81g is connected to the manual shift valve 20 by way of the fluid circuit $P_5$ as mentioned above. The spool 82 has three lands 82a to 82c and is engaged at its upper end with the return spring 83. Within the housing 81, the lower end of the spool 82 is exposed in a pressure chamber 80c in communication to the seventh port 81g and a pair of annular chambers 80a and 80b are formed by the respective lands 82a to 82c of the spool 82.

In operation of the switching valve 80, when the manual shift valve 20 is set in the forward or nuetral position F or N, the line pressure from the fluid circuit $P_2$ may not be applied to the pressure chamber 80c so that the spool 82 is held in the original position due to biasing of the return spring 83. Under this condition, the fluid circuit $P_{16}$ is communicated with the fluid circuit $P_{20}$ across the annular chamber 80a and the fluid circuit $P_{17}$ is communicated with the fluid circuit $P_{21}$ across the second annular chamber 80b. When the line pressure from the fluid circuit $P_2$ is applied to the pressure chamber 80c by way of the fluid circuit $P_5$ in response to setting of the manual shift valve 20 to the reverse position R, the spool 82 is moved upward against the biasing of the spring 83 to communicate the fluid circuit $P_{16}$ to the fluid circuit $P_{21}$ across the second annular chamber 80b and to communicate the fluid circuit $P_{17}$ to the fluid circuit $P_{20}$ across the first annular chamber 80a.

A second switching valve 90 is provided to control the line pressure applied to a fluid actuator AC from the fluid circuit $P_{11}$ or $P_{12}$ in accordance with shifting position of the manual shift valve 20 and operating condition of the engaged clutch LC or HC so as to control the displacement ratio of the first pump-motor $M_1$. This second switching valve 90 comprises a spool 92 reciprocable within a housing 91. The housing 91 is provided thereon with seven ports 91a to 91g, inclusive. The first port 91a is connected to the fluid circuit $P_{20}$ and the seventh port 91g is connected to the fluid circuit $P_{21}$. The second and sixth ports 91b and 91f are connected to the fluid circuit $P_{12}$ and the fourth port 91d is connected to the fluid circuit $P_{11}$. Meanwhile, the third and fifth ports 91c and 91e are respectively connected to fluid circuits $P_{22}$ and $P_{23}$. Within the housing 91 a pair of pressure chambers 90a and 90b are formed at the opposite ends of the spool 92 and a pair of annular chambers 90c and 90d are formed by three lands 92a, 92b and 92c of the spool 92.

With this second switching valve 90, when the line pressure is applied to the upper pressure chamber 90a from the fluid circuit $P_{20}$, the spool 92 is moved down to communicate the fluid circuit $P_{11}$ with the fluid circuit $P_{22}$ across the annular chamber 90c and to communicate the fluid circuit $P_{12}$ to the fluid circuit $P_{23}$ across the annular chamber 90d. When the line pressure is applied to the lower pressure chamber 90b from the fluid circuit $P_{21}$, the spool 92 is moved up to communicate the fluid circuit $P_{12}$ to the fluid circuit $P_{22}$ across the annular chamber 90c and to communicate the fluid circuit $P_{11}$ to the fluid circuit $P_{23}$ across the annular chamber 90d. Thus, the fluid actuator AC is operated in response to movements of the spool 92 to control the displacement ratio of the first pump-motor $M_1$.

Hereinafter, the operation of the hydromechanical transmission mentioned above will be described in detail. During stop of the engine E, the line pressure does not appear in the fluid circuit $P_2$ so that the spool 42 of the bypass valve 40 is positioned in its leftward stroke end to permit fluid communication between the fluid circuits $P_8$ and $P_9$. Thus, the fluid circuits $P_0$ and $P_1$ are bypassed by way of the fluid circuits $P_8$ and $P_9$. As a result, the hydromechanical transmission is conditioned in the neutral position wherein even if the input shaft 2 is driven, the output shaft 10 may not be rotated.

When the engine E is started with the shift lever 23 shifted to the neutral position N from the forward position F, the fluid pump P and the governor valve $G_1$ is rotated by the input shaft 2 to generate the line pressure and the governor pressure. The line pressure is applied to the fluid circuit $P_2$ and subsequently applied to the pressure chamber 40d of the bypass valve 40 by way of the first chamber 20a, the passage 22f and the second chamber 20b of the manual shift valve 20. On the other hand, the governor pressure is controlled in accordance with the rotation speed of the input shaft 2 and applied to the pressure chamber 40b of the bypass valve 40 by way of the fluid circuit $P_7$. In this instance, the piston 32 of the fluid cylinder 30 is positioned in its rightward stroke end due to the line pressure in the left chamber 30a which is applied through the fluid circuits $P_2$ and $P_4$ while the shift lever 23 is previously positioned in the forward position F. Therefore, when the shift lever 23 is shifted to the nuetral position N from the forward position F, the meshing engagement between the dog gear 4a of the gear 4 and the dog gear 5a of the gear 5 is maintained.

Under the above-mentioned condition, even if the rotation speed of the engine E increases, the spool 42 of the bypass valve 40 will remain in its leftward stroke end due to the line pressure in the chamber 40d to permit the fluid communication between the fluid circuits $P_8$ and $P_9$. As a result, the hydromechanical transmission is still conditioned in the neutral to allow the idling operation of the engine E. Furthermore, during this engine starting operation, the spool 122 of the clutch control valve 120 is held in the upward position by means of biasing of the spring 129 so that the fluid circuit $P_2$ is connected to the fluid circuit $P_{17}$ and the fluid circuit $P_{16}$ is connected to the reservoir Re. Thus, the line pressure is applied to the low speed range clutch LC through the fluid circuits $P_2$ and $P_{17}$ to cause the engagement of the low range clutch LC. The line pressure is also applied to the pressure chamber 120b of the clutch control valve 120 through the fluid circuit $P_{17}$ to hold the spool 122 in the upward position and further applied to the lower chamber 110d of the speed ratio responsive valve 110 to hold the spool 112 in the upward position. In this instance, the line pressure in the fluid circuit $P_{17}$ is further applied to the lower pressure chamber 90b of the second switching valve 90 by way of the second annular chamber 80b of the switching valve 80 and the fluid circuit $P_{21}$. This moves up the spool 92 of the valve 90 to connect the fluid circuit $P_{11}$ to the fluid circuit $P_{23}$ and to connect the fluid circuit $P_{12}$ to the fluid circuit $P_{22}$.

During the idling operation of the engine E, the spool 72 of the speed responsive valve 70 is positioned upward by loading of the spring 73 to connect the fluid circuit $P_2$ to the fluid circuit $P_{11}$ and to connect the fluid circuit $P_{12}$ to the reservoir Re. Thus, the line pressure is applied to the lower chamber $AC_1$ of the fluid actuator AC by way of the fluid circuits $P_2$, $P_{11}$ and $P_{23}$ so that the piston $AC_3$ of the actuator AC is urged to the upward stroke end thereof to make the first pump-motor $M_1$ in its full negative capacity as shown by a reference character $-V_M$ in FIG. 3; this particular condition is called hereinafter as the first operation stage.

In the above-mentioned first operation stage, if the engine E is started with the shift lever 23 shifted from the reverse position R to the nuetral position N, the piston 32 of the fluid cylinder 30 is positioned in its leftward stroke end due to the line pressure in the right chamber 30b which is applied through the fluid circuits $P_2$ and $P_5$ while the shift lever 23 is previously positioned in the reverse position R. All other condition and operation are substantially as same as the first operation stage; this particular condition is called hereinafter as the second operation stage.

Under the above-mentioned first operation stage, when the shift lever 23 of the shift valve 20 is shifted from the neutral position N to the forward position F, the fluid circuit $P_2$ opening to the second port 21b is blocked by the land 22a of the spool 22 and the fluid circuit $P_3$ is connected to the reservoir Re thereby to eliminate the line pressure in the chamber 40d of the bypass valve 40. In this instance, the fluid circuit $P_2$ opening to the seventh port 21g is connected to the fluid circuit $P_4$ and the fluid circuit $P_5$ is communicated with the reservoir Re so that the piston 32 of the cylinder 30 is held in the initial rightward stroke end to maintain the initial meshing engagement between the gear 4 and the gear 5 so as to complete the forward drive power train of the hydromechanical transmission H; this particular condition is called hereinafter as the third operation stage.

Moreover, under the above-mentioned second operation stage, when the shift lever 23 of the shift valve 20 is shifted from the neutral position N to the forward position F, the left chamber 30a of the cylinder 30 is communicated with the fluid circuit $P_2$ through the fluid circuit $P_4$ and the right chamber 30b is connected to the reservoir Re through the fluid circuit $P_5$. This causes rightward movement of the piston 32 of the cylinder 30 and the operation rod 52. During this rightward movement of the operation rod 52, the fluid circuit $P_2$ is temporarily connected to the fluid circuit $P_6$ across the annular chamber 50a of the control valve 50 so that the line pressure is applied to the pressure chamber 40a of the bypass valve 40 to move the spool 42 rightward against loading of the spring 45. Thus, the fluid communication between the fluid circuits $P_8$ and $P_9$ is temporarily closed to operate the second pump-motor $M_2$ as a motor. Then, the gear 5 rotatable on the driving shaft 3 is driven by the motor operation of the second pump-motor $M_2$ by way of the low speed range clutch LC and the differential gear unit D so that the synchronized meshing engagement between the dog gear 4a of the gear 4 and the dog gear 5a of the gear 5 is conducted in response to the rightward movement of the selector lever CF to complete the forward drive power train of the hydromechanical transmission H.

After completing of the forward drive power train, when the opening angle $\theta$ of the throttle S is increased to a point $Q_1$ in FIG. 2a to accelerate the engine E, the throttle pressure applied to the fluid circuit $P_{10}$ is increased in accordance with the increase of the opening angle $\theta$ of the throttle S and the spool 72 of the speed responsive valve 70 is held in the upward displaced position to maintain the communication between the fluid circuits $P_2$ and $P_{11}$. Meanwhile, the governor pressure generated in the governor valve $G_1$ increases in response to acceleration of the engine E. Thus, when the governor pressure acting on the spool 72 is balanced with the total urging force of the spring 73 and the throttle pressure, the spool 72 is slightly moved down and the fluid circuits $P_{11}$ and $P_{12}$ are blocked by the lands 72b and 72c of the spool 72. Subsequently, when the governor pressure is further increased, the spool 72 moves down to connect the fluid circuit $P_2$ to the fluid circuit $P_{12}$ and to connect the fluid circuit $P_{11}$ to the reservoir Re. Then, the piston $AC_3$ of the actuator AC is instantly moved down by the line pressure applied to the upper chamber $AC_2$ by way of the fluid circuits $P_2$, $P_{12}$ and $P_{22}$ so that the pump displacement of the first pump-motor $M_1$ is varied from the full negative capacity $-V_M$ toward the full positive capacity $+V_M$ in FIG. 3 to increase the speed ratio e of the hydromechanical transmission H. In this instance, running resistances of the vehicle are given to the engine E as a load which increases in response to the increase of the speed ratio e to restrain the increase of the engine rotation.

Furthermore, in this increasing process of the speed ratio e, the spool 102 of the speed ratio detecting valve 100 is gradually moved down due to increasing of the governor pressure applied to the upper chamber 100a from the second governor valve $G_2$, but the fluid circuits $P_{11}$ and $P_{12}$ may not be connected to the fluid circuits $P_{15}$ and $P_{14}$ in this low speed travelling of the vehicle.

In starting of the vehicle as described above, when the accelerator pedal is depressed in a small amount, the rotation speed of the engine E is decreased due to increase of the running resistances before the speed ratio e increases up to the figure $e_1$* shown in FIG. 3 and corresponds with the predetermined speed defined by the instant depression stroke of the accelerator pedal. Thus, the governor pressure acting on the spool 72 of the speed responsive valve 70 decreases and is balanced with the total urging force of the spring 73 and the throttle pressure so that the spool 72 is slightly moved up and the fluid circuits $P_{11}$ and $P_{12}$ are blocked by the lands 72b and 72c of the spool 72. This results in blocking of the line pressure applied to the actuator AC to maintain the displacement capacity of the first pump-motor $M_1$ in an instant value. Thus, the increase of the speed ratio e is restrained in a low value to maintain the low speed travelling of the vehicle.

In starting of the vehicle as described above, when the accelerator pedal is depressed in a large amount, the rotation speed of the engine E does not decrease in spite of the increase of the runnin resistances before the speed ratio e increases near the figure $e_1$* shown in FIG. 3 and is maintained over the predetermined speed defined by the instant depression stroke of the accelerator pedal. In this instance, the spool 72 of the speed responsive valve 70 is remained in the downward position to continuously apply the line pressure from the fluid circuit $P_2$ to the fluid circuit $P_{12}$ so that the speed ratio e increases and reaches the figure $e_1$*. Then, the spool 102 of the speed ratio detecting valve 100 is moved down due to increase of the governor pressure given to the upper pressure chamber 100a to connect the fluid circuits $P_{11}$ and $P_{12}$ to the fluid circuits $P_{15}$ and $P_{14}$ respectively. As a result, the line pressure is applied to the fluid circuit $P_{14}$ from the fluid circuit $P_{12}$ and, in turn, applied to the upper pressure chamber 120e of the valve 120 by way of the annular chamber 110b of the valve 110 and the orifice $O_2$ of the fluid circuit $P_{18}$. Then, the spool 122 is moved down by the piston 123 with the predetermined time lag defined by the orifice $O_2$ so that the fluid circuit $P_2$ is connected to the fluid circuit $P_{16}$ to engage the high range clutch HC and the fluid circuit $P_{17}$ is connected to the reservoir Re to disengage the low range clutch LC.

Under this condition, the spool 112 of the valve 110 is moved down due to the line pressure applied to the upper pressure chamber 110a from the fluid circuit $P_{16}$ and simultaneously the spool 92 of the second switching valve 90 is moved down due to the line pressure applied to the upper pressure chamber 90a from the fluid circuit $P_{16}$ through the fluid circuit $P_{20}$. This applies the line pressure from the fluid circuit $P_2$ to the lower chamber $AC_1$ of the actuator AC to move the piston $AC_3$ upward. Consequently, the displacement capacity of the first pump-motor $M_1$ is varied from the full positive capacity $+V_M$ to the full negative capacity $-V_M$. Thus, the speed ratio e further increases and the load acting on the engine E will increase in accordance with the increase of the speed of the vehicle to maintain the rotation speed of the engine E in the predetermined speed defined by the instant depression stroke of the accelerator pedal.

When the rotation speed of the engine E is maintained in the predetermined speed as described above, the governor pressure acting on the spool 72 of the valve 70 is balanced with the total urging force of the spring 73 and the throttle pressure so that the spool 72 is slightly moved up to block the fluid communication of the fluid circuit $P_2$ against the fluid circuits $P_{12}$ and $P_{11}$. Then, the displacement capacity of the first pump-motor $M_1$ is maintained in an instant value and the increase of the speed ratio e is restrained in a high value to maintain the high speed travelling of the vehicle.

Under the low speed travelling or the high speed travelling of the vehicle as mentioned above, the rotation speed of the engine E decreases or increases in accordance with the changes of the running resistances of the vehicle. If the rotation speed of the engine E increases, the speed responsive valve 70 serves to connect the fluid circuit $P_2$ to the fluid circuit $P_{12}$ so as to increase the speed ratio e of the vehicle. Then the rotation speed of the engine E is decreased in accordance with the increase of the speed ratio e. Conversely if the rotation speed of the engine E decreases, the valve 70 serves to connect the fluid circuit $P_2$ to the fluid circuit $P_{11}$ so as to decrease the speed ratio e. Then the rotation speed of the engine E is increased in accordance with the decrease of the speed ratio e. From the above description, it will be noted that the speed ratio e is frequently varied to maintain the travelling speed of the vehicle determined by the instant depression stroke of the accelerator pedal.

In case the speed ratio e reaches the figure $e_1$* during its frequent fluctuation in a range just below the figure $e_1$* shown in FIG. 3, the fluid circuit $P_{12}$ is connected to the fluid circuit $P_{14}$ in response to the operation of the speed ratio detecting valve 100 so as to apply the line pressure to the upper pressure chamber 120e of the clutch control valve 120 by way of the orifice $O_2$ in the fluid circuit $P_{18}$. In this instance, however, the fluid communication between the fluid circuits $P_{12}$ and $P_{14}$ is instantly disconnected due to the decrease of the speed ratio e in the predetermined time lag defined by the orifice $O_2$. Consequently, the spool 122 of the valve 120 cannot be moved down to maintain the engagement of the low range clutch LC.

Conversely, in case the speed ratio e reaches the figure $e_2$* during the frequent fluctuation of the speed ratio e in a range just beyond the figure $e_2$* shown in FIG. 3, the fluid circuit $P_{11}$ is connected to the fluid circuit $P_{15}$ in response to the operation of the speed ratio detecting valve 100 so as to apply the line pressure to the lower pressure chamber 120g of the valve 120 by way of the orifice $O_3$ in the fluid circuit $P_{19}$. In this instance, however, the fluid communication between the fluid circuits $P_{11}$ and $P_{15}$ is instantly disconnected due to the increase of the speed ratio e in the predetermined time lag defined by the orifice $O_3$. Consequently, the spool 122 of the valve 120 cannot be moved up to maintain the engagement of the high range clutch HC.

During the high speed travelling of the vehicle, if the accelerator pedal is released to temporarily decrease the throttle pressure, the spool 72 of the valve 70 is moved down to connect the fluid circuit $P_2$ to the fluid circuit $P_{12}$. This causes upward movement of the piston $AC_3$ of the actuator AC due to the line pressure applied to the lower chamber $AC_1$ through the fluid circuits $P_2$, $P_{12}$ and $P_{23}$. Then, the displacement capacity of the first pump-motor $M_1$ is varied toward the full negative capacity $-V_M$ to increase the speed ratio e. In this increasing process of the speed ratio e, the rotation speed of the engine E is instantly decreased down to correspond with the predetermined speed defined by the instant depression stroke of the accelerator pedal. As a result, the spool 72 of the valve 70 is moved up to block the fluid communication between the fluid circuits $P_2$ and $P_{12}$ so as to restrain the increase of the speed ratio e. Subsequently, when the rotation speed of the engine E is decreased below the predetermined speed, the speed responsive valve 70 serves to connect the fluid circuit $P_2$ to the fluid circuit $P_{11}$ so that the piston $AC_3$ of the actuator AC is moved down due to the line pressure applied to the upper chamber $AC_2$ through the fluid circuits $P_2$, $P_{11}$ and $P_{22}$. This varies the displacement capacity of the first pump-motor $M_1$ toward the full positive capacity $+V_M$ to decrease the speed ratio e so as to restrain the decrease of the rotation speed of the engine E. In this instance, if the rotation speed of the engine E cannot be increased up to the predetermined speed after the speed ratio e falls near the figure $e_2^*$, the speed responsive valve 70 serves to continuously connect the fluid circuit $P_2$ to the fluid circuit $P_{11}$ so as to further vary the displacement capacity of the first pump-motor $M_1$. Then, the speed ratio e is further decreased down to the figure $e_2^*$ and sebsequently the speed ratio detecting valve 100 serves to connect the fluid circuit $P_{11}$ and $P_{12}$ to the fluid circuits $P_{15}$ and $P_{14}$ respectively. This applies the line pressure to the lower pressure chamber 120g of the valve 120 by way of the fluid circuits $P_{11}$, $P_{15}$ and $P_{19}$. After the predetermined time lag defined by the orifice $O_3$ in the flid circuit $P_{19}$, the spool 122 of the valve 120 is moved up by the piston 124 to connect the fluid circuit $P_2$ to the fluid circuit $P_{17}$ and connect the fluid circuit $P_{16}$ to the reservoir Re so that the high range clutch HC is disengaged and the low range clutch LC is engaged. In this instance, the spool 112 of the valve 110 is moved up due to the line pressure from the fluid circuit $P_{17}$ and the spool 92 of the valve 90 is also moved up due to the line pressure. Thereafter, the piston $AC_3$ of the actuator AC is moved up due to the line pressure applied into the lower chamber $AC_1$ from the fluid circuit $P_{11}$ and then the capacity of the first pump-motor $M_1$ is varied toward the full negative capacity $-V_M$ from the approximate full positive capacity $+V_M$. Thus, the speed ratio e is further decreased to decrease the rotation speed of the engine E down to the predetermined speed. As a result, the valve 70 serves to block the fluid communication of the fluid circuit $P_2$ against the fluid circuits $P_{11}$ and $P_{12}$ so as to restrain the decrease of the speed ratio e. Thereafter, when the accelerator pedal is released, the speed responsive valve 70 serves to connect the fluid circuit $P_2$ to the fluid circuit $P_{11}$ in response to increase of the throttle pressure as shown in FIG. 2a so that the speed ratio e is gradually decreased to effect the engine braking operation of the vehicle.

In the above-mentioned first operation stage, when the engine E is operated with the shift lever 23 shifted from the neutral position N to the reverse position R, the fluid circuit $P_2$ is connected to the fluid circuit $P_5$ across the annular chamber 20d of the valve 20 so that the line pressure is applied to the lower chamber 80c of the switching valve 80 to displace the spool 82 upward. Then, the fluid circuit $P_{17}$ is connected to the fluid circuit $P_{20}$ to apply the line pressure to the upper chamber 90a of the second switching valve 90. This moves the spool 92 downward to communicate the fluid circuit $P_{11}$ to the fluid circuit $P_{22}$. Thus, the piston $AC_3$ of the actuator AC is moved to the downward stroke end thereof due to the line pressure applied to the upper chamber $AC_2$ from the fluid circuit $P_{11}$ and the initial displacement capacity of the first pump-motor $M_1$ is converted from the full negative capacity $-V_M$ to the full positive capacity $+V_M$. In this instance, as the fluid circuit $P_4$ is communicated with the reservoir Re across the annular chamber 20c of the shift valve 20, the piston 32 of the actuator 30 is moved leftward due to the line pressure applied to the right chamber 30b from the fluid circuit $P_5$ so that the selector level CF disengages the dog gear 4a of the gear 4 from the dog gear 5a of the gear 5. Moreover, during the leftward movement of the piston 32, the fluid circuit $P_2$ is temporarily communicated with the fluid circuit $P_6$ across the annular chamber 50a of the control valve 50 to apply the line pressure to the chamber 40a of the bypass valve 40. This moves the spool 42 of the bypass valve 40 rightward to temporarily block the fluid communication between the fluid circuits $P_8$ and $P_9$. Thus, the second pump-motor $M_2$ is operated as a motor to conduct the synchronized meshing engagement of the gear 4 with the gear 6a on the counter shaft 6; this condition is called as the fourth operation stage. Under this fourth operation stage, the reverse drive power train of the transmission is completed by the synchronized engagement of the gear 4 and the gear 6a to drive the output shaft 10 in the reverse direction.

In the above-mentioned embodiment, although the governor valves $G_1$ and $G_2$ are respectively mounted on the input shaft 2 and the output shaft 10 to detect the instant speed ratio e, the governor valves may be respectively mounted on the output shafts 12 and 13 of the low and high range clutches LC and HC.

Furthermore, in the above-mentioned embodiment, although the line pressure applied to the actuator AC is controlled by the speed responsive valve 70 which is operated in response to the throttle pressure from the throttle valve 60 and the governor pressure from the governor valve $G_1$, the line pressure to the actuator AC may be controlled by an electric control system, as shown in FIG. 4. In the electric control system, a servo-valve SV is provided to control the line pressure and a servo-amplifier SA is provided to control the operation of the servo-valve SV. The servo-amplifier SA is operated in accordance with first and second voltage signals $n_o$ and $n_e$ which correspond respectively with the throttle pressure and the governor pressure in the above-embodiment. The first voltage signal $n_o$ is applied to the first input terminal of the servo-amplifier SA from a potentiometer $P_M$ by way of a first amplifier $A_1$, a function converter $C_1$ and a second amplifier $A_2$. The potentiometer $P_M$ is operated in accordance with variation of the opening angle $\theta$ of the throttle S to generate a voltage $n_o'$, as shown in FIG. 4A, which is detected as the first voltage signal $n_o$ by conversion in the function converter $C_1$, as shown in FIG. 4B. The function converter $C_1$ comprises an analogue-digital converter A-D, a first decoder $D_1$, a read only memory ROM, a second decoder $D_2$ and a digital-analogue converter D-A. The second voltage signal $n_e$ is applied to the second input terminal of the servo-amplifier SA from a sensor $S_1$ by way of a frequency-voltage converter FV. The sensor $S_1$ is mounted on a portion of the input shaft 2 to detect the rotation speed of the input shaft 2.

In the servo-amplifier SA, the first and second voltage signals $n_o$ and $n_e$ are constantly compared and amplified. When the first voltage signal $n_o$ is larger than the second voltage signal $n_e$, the servo-amplifier SA generates a negative voltage which is applied to the servo-valve SV. In this instance, the servo-valve SV acts to connect the fluid circuit $P_2$ to the fluid circuit $P_{11}$ and to connect the fluid circuit $P_{12}$ to the reservoir Re. When the first voltage signal $n_o$ is smaller than the second voltage signal $n_e$, the servo-amplifier SA generates a positive voltage and subsequently the servo-valve SV acts to connect the fluid circuit $P_2$ to the fluid circuit $P_{12}$ and to connect the fluid circuit $P_{11}$ to the reservoir Re. Furthermore, when the positive and negative voltages are not applied to the servo-valve SV, the fluid circuit $P_2$ is isolated from the fluid circuits $P_{11}$ and $P_{12}$ in the servo-valve SV.

Figure 5:
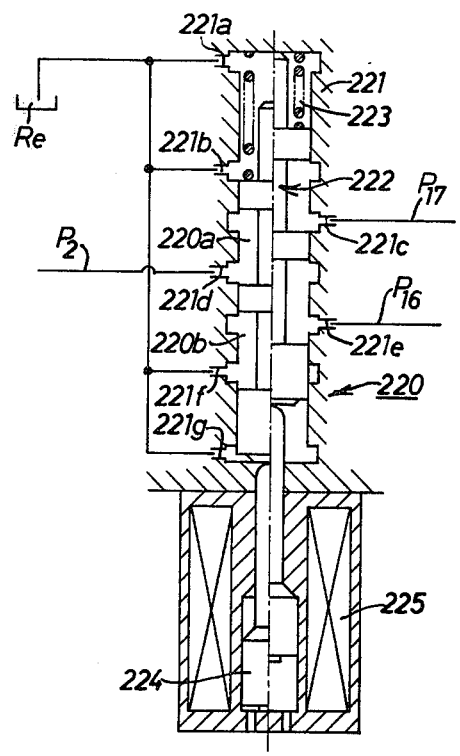
FIG. 5 illustrates a solenoid valve for a modification of the present invention.
Figure 6:
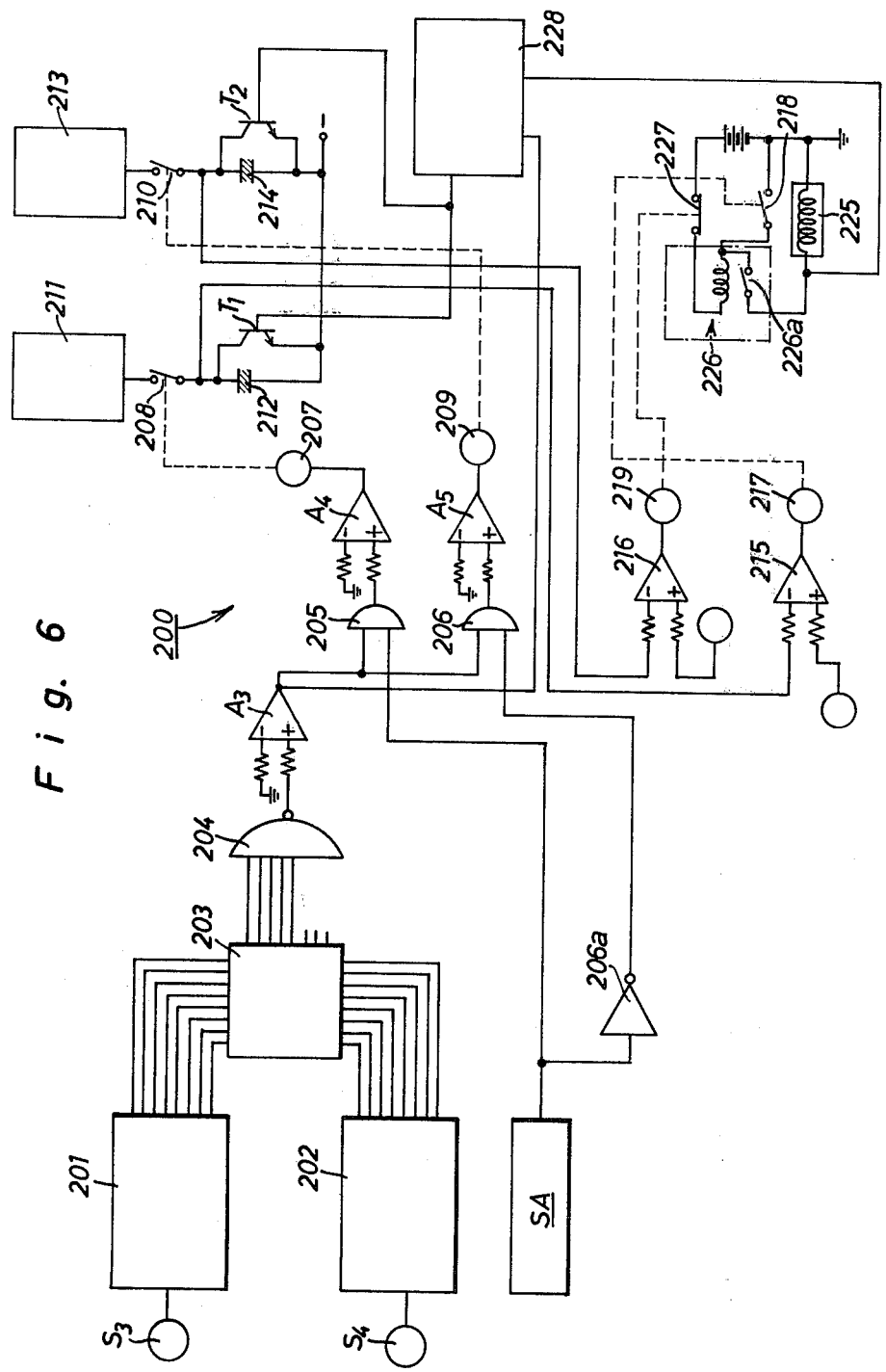
FIG. 6 illustrates an electric control system for a modification of the present invention.

FIGS. 6 and 5 illustrate an electric control system 200 and a solenoid valve 220 which correspond with the speed ratio detecting valve 100, the speed ratio responsive valve 110 and the clutch control valve 120 in the above-embodiment.

As shown in FIG. 5, the solenoid valve 220 comprises a housing 221 with seven ports and a spool 222 with three lands. The spool 222 is normally biased downward by a return spring 223 and engaged with a plunger 224 at the bottom end thereof. In the solenoid valve 220, during deenergization of a solenoid 225, the spool 222 is positioned in the downward stroke end to connect the fluid circuit $P_2$ to the fluid circuit $P_{17}$ across an annular chamber 220a and to connect the fluid circuit $P_{16}$ to the reservoir Re across an annular chamber 220b. When the spool 222 is moved up by the plunger 224 against the spring 223 in response to energization of the solenoid 225, the fluid circuit $P_2$ is connected to the fluid circuit $P_{16}$ across the chamber 220b and the fluid circuit $P_{17}$ is connected to the reservoir Re across the chamber 220a.

In FIG. 6, the electric control system 200 is provided to control the solenoid valve 220 and comprises a first sensor $S_3$ to detect a rotation of the output shaft 12 of the low range clutch LC and a second sensor $S_4$ to detect a rotation of the output shaft 13 of the high range clutch HC. The electric control system 200 further comprises first and second detectors 201 and 202 to digitally detect output signals from the respective sensors $S_3$ and $S_4$ and a subtraction circuit 203 to detect a difference between the output signals from the first and second detectors 201 and 202 so as to detect an instant speed ratio e of the vehicle.

Furthermore, in the electric control system 200, a NOR circuit 204 is provided to generate a high level output signal when an instant speed ratio e detected by the subtraction circuit 203 becomes a figure between the figures $e_1^*$ and $e_2^*$ of FIG. 3. The NOR circuit 204 is connected at its output terminal to each first input terminal of AND circuits 205 and 206 through an amplifier $A_3$. The AND circuit 205 is connected at a second input terminal thereof with the servo-amplifier SA to receive a positive voltage from the servo-amplifier SA, whereas the AND circuit 206 is connected at a second input terminal thereof with the servo-ammplifier SA through an inverter 206a to receive a negative voltage from the servo-amplifier SA. Thus, when a high level output signal is issued from the NOR circuit 204 and a positive voltage is generated in the servo-amplifier SA, the AND circuit 205 generates a high level signal which is applied to a read relay 207 through an amplifier $A_4$ to close a normally open contact 208. Meanwhile, when a high level output signal is issued from the NOR circuit 204 and a negative voltage is generated in the servo-amplifier SA, the AND circuit 206 generates a high level signal which is applied to a reed relay 209 through an amplifier $A_5$ to close a normally open contact 210.

The contact 208 is interposed between a constant-current power source 211 and a capacitor 212. The capacitor 212 is connected between the emitter and collector of a transistor $T_1$, of which base is connected to an output terminal of a trigger circuit 228. Meanwhile, the contact 210 is interposed between a constant-current power source 213 and a capacitor 214. The capacitor 214 is connected between the emitter and collector of a transistor $T_2$, of which base is connected to the output terminal of the trigger circuit 228. The trigger circuit 228 is connected at its first input terminal to the output terminal of the amplifier $A_3$ and connected at its second input terminal to a junction between the solenoid 225 and a normally open contact 226a. The trigger circuit 228 is designed such that the transistors $T_1$ and $T_2$ are turned on while the high level output signal of the NOR circuit 204 does not appear at the input terminal of the trigger circuit 228 and that the transistors $T_1$ and $T_2$ are turned off while the high level output signal of the NOR circuit 204 appears at the input terminal of the trigger circuit 228. The trigger circuit 228 is further designed such that the transistors $T_1$ and $T_2$ are turned on when the solenoid 225 is energized after the trigger circuit 228 receives the high level output signal of the NOR circuit 204 and that the conduction of the transistors $T_1$ and $T_2$ are maintained even when the high level output signal of the NOR circuit 204 does not appear under energization of the solenoid 225. Furthermore, the trigger circuit 228 is designed such that the transistors $T_1$ and $T_2$ are turned off when the trigger circuit 228 receives again the high level output signal of the NOR circuit 204 under the energization of the solenoid 225 and that the transistors $T_1$ and $T_2$ are turned on when the solenoid 225 is deenergized after the trigger circuit 228 receives the high level output signal of the NOR circuit 204.

With the electric control system 200, upon closing of the contact 208, the power source 211 charges the capacitor 212, of which charged voltage is applied to a comparator 215. When the charged voltage of the capacitor 212 rises up to a predetermined value due to the continuous closure of the contact 208, the comparator 215 drives a reed relay 217 to close a normally open contact 218. This energizes an electro-magnetic relay 226 to close the contact 226a so as to energize the solenoid 225 of the solenoid valve 220. Thus, the low range clutch LC is disengaged and the high range clutch HC is engaged to increase the speed ratio e. In this instance, after energization of the solenoid 225, the trigger circuit 228 functions to turn on the transistors $T_1$ and $T_2$ so as to instantly discharge the capacitor 212. As a result, the reed relay 217 is deenergized to open the contact 218, but the relay 226 is energized by closing of the contact 226a to maintain the energization of the solenoid 225. If the contact 208 is opened before the charged voltage of the capacitor 212 rises up to the predetermined value, the trigger circuit 228 functions to turn on the transistor $T_1$ so that the capacitor 212 is instantly discharged and the solenoid 225 cannot be energized.

When the contact 210 is closed under the energization of the solenoid 225, the transistor $T_2$ is turned off by controlling of the trigger circuit 228 and the capacitor 214 is charged by the power source 213. Subsequently, when the charged voltage of the capacitor 214 rises up to a predetermined value due to the continuous closure of the contact 210, the relay 219 is energized to open a normally close contact 227. Then, the solenoid 225 is deenergized to disengage the high range clutch HC and engage the low range clutch LC and, in this instance, the trigger circuit 228 functions to turn on the transistors $T_1$ and $T_2$. If the contact 210 is opened before the charged voltage of the capacitor 214 rises up to the predetermined value, the trigger circuit 228 functions to turn on the transistor $T_2$ so as to instantly discharge the capacitor 214. From the above description, it will be noted that the solenoid valve 220 shown in FIG. 5 is controlled by the electric control system 200 substantially as same as the clutch control valve 120 of the previous embodiment.

Figure 7:
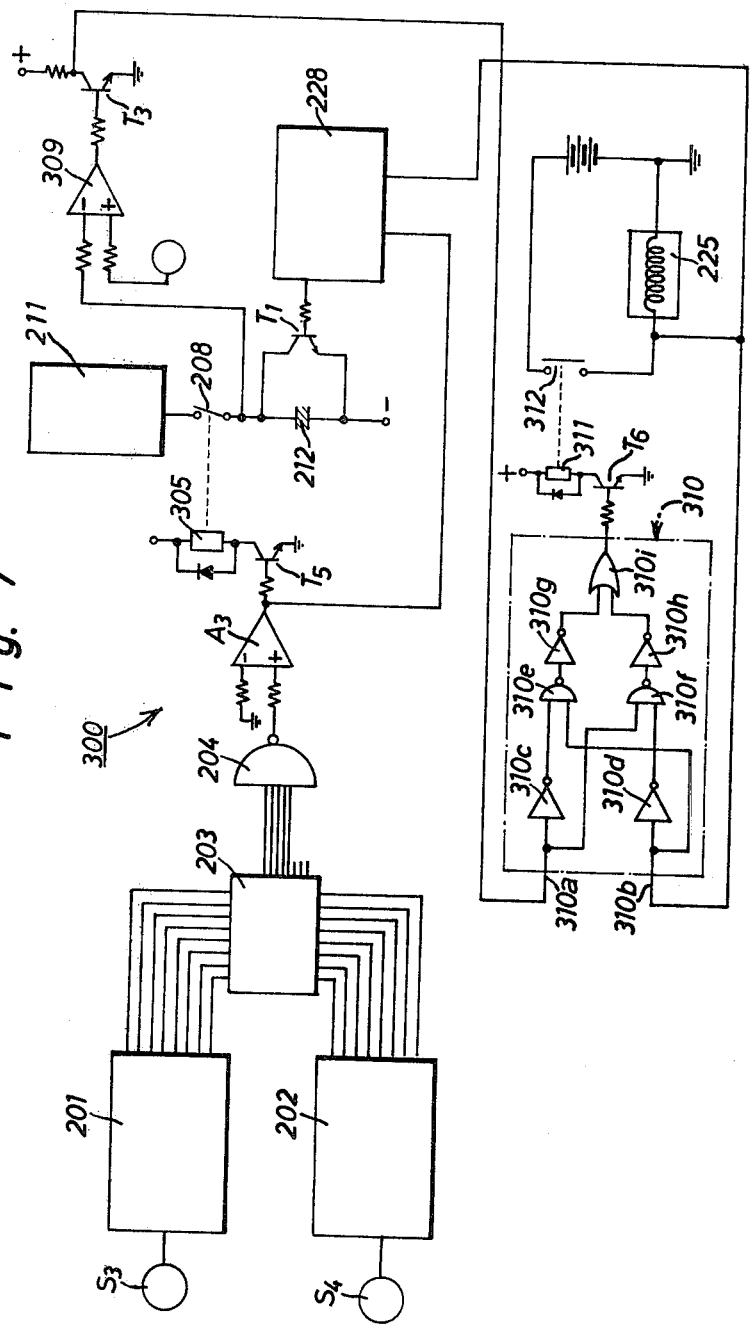
FIG. 7 illustrates another modification of the electric control system shown in FIG. 6.

FIG. 7 illustrates a modification of the electric control system 200 for the solenoid valve 220 described above. In this modification, a transistor $T_5$ is connected at its base to the output terminal of the NOR circuit 204 through the amplifier $A_3$ and a reed relay 305 is connected to the collector of the transistor $T_5$ to operate a normally open contact 208. The contact 208 is interposed between the constant-current power source 211 and the capacitor 212. The capacitor 212 is connected between the emitter and collector of the transistor $T_1$, of which base is connected to the ouput terminal of the trigger circuit 228 as described above with reference to FIG. 6. A comparator 309 is connected at its input terminal to a junction between the contact 208 and the capacitor 212 and is connected at its output terminal to the base of a transistor $T_3$. The transistor $T_3$ is grounded at its emitter and connected at its collector to the prime battery of the vehicle through a resistor and to a first input terminal 310a of a control circuit 310, of which second input terminal 310b is connected to a junction between the solenoid 225 and a normally open contact 312 of a reed relay 311. The control circuit 310 comprises a first NAND circuit 310e, of which one input terminal is connected to the collector of the transistor $T_3$ through an inverter 310c and of which other input terminal is connected to the junction between the solenoid 225 and the normally open contact 312. The NAND circuit 310e is also connected at the output terminal thereof to one input terminal of an OR circuit 310i through an inverter 310g. The control circuit 310 further comprises a second NAND circuit 310f, of which one input terminal is connected to the collector of the transistor $T_3$ and of which other input terminal is connected through an inverter 310d to the junction between the solenoid 225 and the contact 312. The NAND circuit 310f is also connected at the output terminal thereof through an inverter 310h to the other input terminal of the OR circuit 310i, of which output terminal is connected to the base of a transistor $T_6$ through a resistor.

When this modified electric control system 300, when a high level output sighal of the NAND circuit 204 is applied to the base of the transistor $T_5$ through the amplifier $A_3$, the transistor $T_5$ is turned on to energize the reed relay 305 so as to close the contact 208. Upon closing of the contact 208, the power source 211 charges the capacitor 212, of which charged voltage is applied to the comparator 309. When the charged voltage of the capacitor 212 rises up to the predetermined value, the comparator 309 generates a low level output signal to turn off the transistor $T_3$. Then, a high level output signal of the transistor $T_3$ is applied to the first input terminal 310a of the control circuit 310 so that the transistor $T_6$ is turned on to energize the reed relay 311. As a result, the contact 312 of the relay 311 is closed to energize the solenoid 225, thereby to engage the high range clutch HC and disengage the low range clutch LC. In this instance, after energization of the solenoid 225, the trigger circuit 228 functions to turn on the transistor $T_1$ so as to instantly discharge the capacitor 212. Thus, the comparator 309 generates a high level output signal to turn on the transistor $T_3$ so that a low level output signal from the transistor $T_3$ is applied to the first input terminal 310a of the control circuit 310. Under this condition, as the solenoid 225 is energized, the relay 311 is continuously energized to maintain the energization of the solenoid 225. Thereafter, the reed relay 305 is deenergized to open the contact 208 when the high level output signal does not appear at the NOR circuit 204. If the contact 208 is opened before the charged voltage of the capacitor 212 rises up to the predetermined value, the trigger circuit 228 functions to turn on the transistor $T_1$ so that the capacitor 212 is instantly discharged and the solenoid 225 cannot be energized.

When the contact 208 is closed under the energization of the solenoid 225, the transistor $T_1$ is turned off by controlling of the trigger circuit 228 and the capacitor 212 is charged again by the power source 211. Subsequently, when the charged voltage of the capacitor 212 rises up to the predetermined value due to the continuous closure of the contact 208, the comparator 309 generates a low level output signal to turn off the transistor $T_3$. Then, the control circuit 310 receives the high level output signal from the transistor $T_3$ under the energization of the solenoid 225 so that the relay 311 is deenergized to open the contact 312. As a result, the solenoid 225 is deenergized to disengage the high range clutch HC and engage the low range clutch LC, and simultaneously the trigger circuit 228 functions to turn on the transistor $T_1$. Thus, the comparator 309 generates the high level output signal to turn on the transistor $T_3$ and then the control circuit 310 receives the low level output signal of the transistor $T_3$ under the deenergization of the solenoid 225 to maintain the deenergization of the relay 311. From the above description, it will be noted that the solenoid valve 220 shown in FIG. 5 is controlled by the electric control system 300 substantially as same as the electric control system 200.

Figure 8:
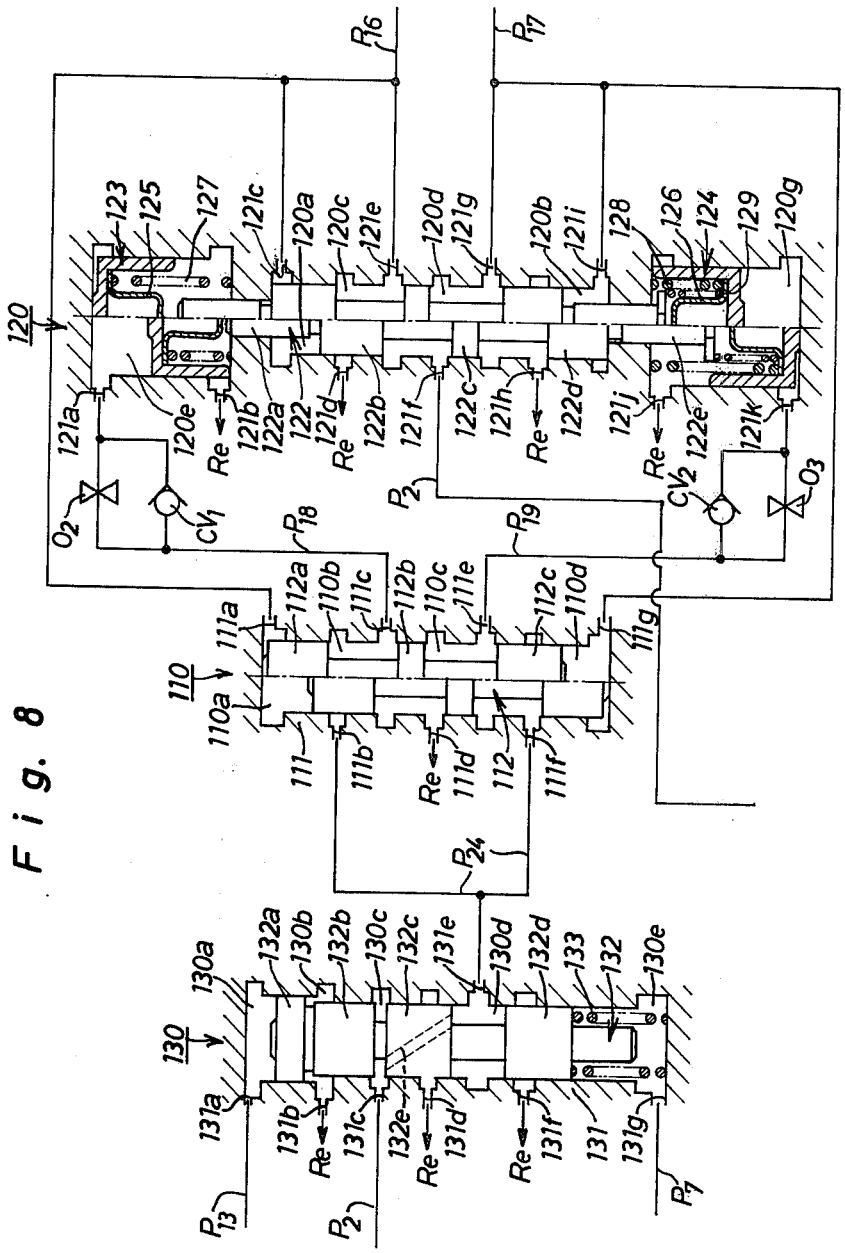
FIG. 8 illustrates a modification of the hydraulically operated valves shown in FIG. 2C.

FIG. 8 illustrates a modification of the speed ratio detecting valve 100 in FIG. 2C, in which a speed ratio detecting valve 130 comprises a housing 131, a spool 132 reciprocable within the housing 131, and a compression spring 133 having a predetermined load. The housing 131 is provided thereon with seven ports 131a to 131g, inclusive. The seventh port 131g is connected to the governor valve $G_1$ through the fluid circuit $P_7$ and the first port 131a is connected to the second governor valve $G_2$ through the fluid circuit $P_{13}$. The third port 131c is connected to the fluid circuits $P_2$ and the fifth port 131e is connected through a fluid circuit $P_{24}$ to the second and sixth ports 111b and 111f of the speed ratio responsive valve 110, the remaining ports 131b, 131d and 131f being connected to the reservoir Re. The spool 132 has four lands 132a to 132d and is engaged at the bottom end thereof with the spring 133 which normally urges the spool 132 upward. Within the housing 131, a pair of pressure chambers 130a and 130e are formed at the opposite ends of the spool 132 and three annular chambers 130b to 130d are formed by the respective lands 132a to 132d of the spool 132. Moreover, the annular chambers 130c and 130d are communicated with each other through a passage 132e of the spool 132.

In this speed ratio detecting valve 130, the spool 132 is moved due to a difference between two governor pressures applied into the upper and lower chambers 130a and 130e and the biasing force of the compression spring 133. The chamber 130d is communicated through the passage 132e with the third port 131c to connect the fluid circuit $P_2$ to the fluid circuit $P_{24}$ while the speed ratio e is maintained in the range between the figures $e_1^*$ and $e_2^*$. When the speed ratio e is smaller than the figure $e_1^*$, the chamber 130d is communicated with the fourth port 131d to connect the fluid circuit $P_{24}$ to the reservoir Re. When the speed ratio e is larger than the figure $e_2^*$, the chamber 130d is communicated with the fifth port 131f to connect the fluid circiut $P_{24}$ to the reservoir Re.

Furthermore, in this speed ratio detecting valve 130, when the speed ratio e reaches the figure $e_1^*$ under the engagement of the low range clutch LC, the speed ratio detecting valve 130 communicates the fluid circuit $P_2$ with the fluid circuit $P_{24}$ so that the line pressure from the fluid circuit $P_2$ is applied to the chamber 110b of the valve 110 through the fluid circuit $P_{24}$ and then to the upper pressure chamber 120e of the clutch control valve 120 by way of the fluid circuit $P_{18}$ and the orifice $O_2$. As a result, after the predetermined time lag defined by the orifice $O_2$, the upper piston 123 of the valve 120 is moved down against the springs 127 and 129 due to the line presssure applied into the upper pressure chamber 120e so that the spool 122 is moved down to connect the fluid circuit $P_2$ to the fluid circuit $P_{16}$ and to connect the fluid circuit $P_{17}$ to the reservoir Re. This engages the high range clutch HC and disengages the low range clutch LC.

Meanwhile, when the speed ratio e falls down to the FIG. $e_2^*$ under the engagement of the high range clutch HC, the speed ratio detecting valve 130 communicates the fluid circuit $P_2$ with the fluid circuit 24 so that the line pressure from the fluid circuit $P_2$ is applied to the chamber 110c of the valve 110 through the fluid circuit $P_{24}$ and then to the lower pressure chamber 120g of the valve 120 by way of the fluid circuit $P_{19}$ and the orifice $O_3$. As a result, after the predetermined time lag defined by the orifice $O_3$, the lower piston 124 is moved upward against the spring 128 due to the line pressure applied into the lower pressure chamber 120g so that the spool 122 is moved up to connect the fluid circuit $P_2$ to the fluid circuit $P_{17}$ and to connect the fluid circuit $P_{16}$ to the reservoir Re. This engages the low range clutch LC and disengages the high range clutch HC.

Figure 9:
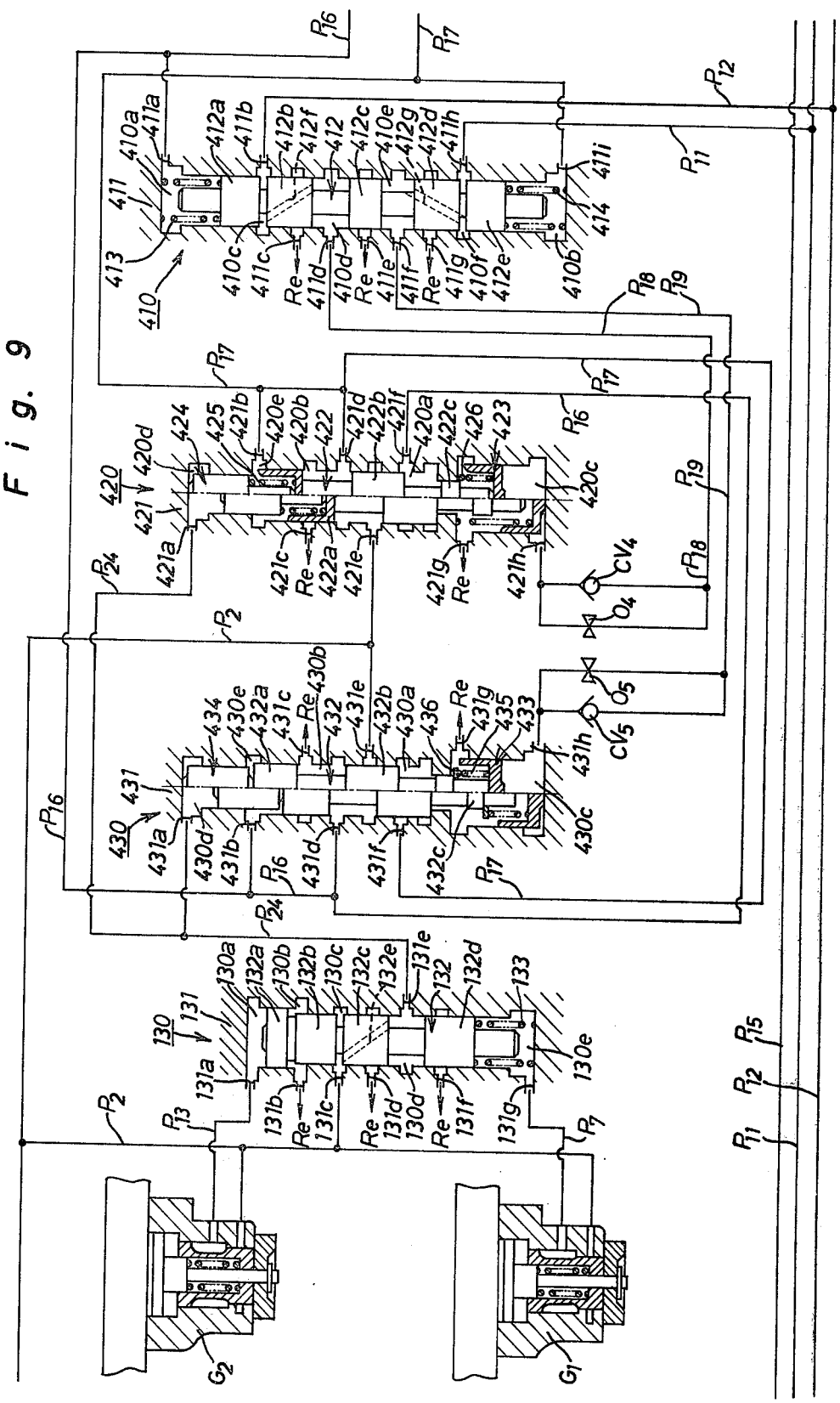
FIG. 9 illustrates another modification of the hydraulically operated valves shown in FIG. 2C.

In FIG. 9, there is illustrated another modification of the speed ratio detecting valve 100, the speed ratio responsive valve 110 and the clutch control valve 120 shown in FIG. 2C. This modification comprises the speed ratio detecting valve 130 shown in FIG. 8, a speed ratio responsive valve 410, and low and high range clutch control valves 420 and 430. The speed ratio responsive valve 410 includes a spool 412 reciprocable within a housing 411 and a pair of compression springs 413 and 414 respectively engaged with the opposite ends of the spool 412. The housing 411 is provided thereon with nine ports 411a to 411i, inclusive. The first port 411a is connected by way of the fluid circuit $P_{16}$ to the high range clutch HC of FIG. 2D and the ninth port 411i is connected by way of the fluid circuit $P_{17}$ to the low range clutch LC. The second port 411b is connected by way of the fluid circuit $P_{12}$ to the fifth port 70e of the speed responsive valve 70 of FIG. 2A and the eighth port 411h is connected by way of the fluid circuit $P_{11}$ to the third port 70c of the speed responsive valve 70. The fourth port 411d is connected to the fluid circuit $P_{18}$ and the sixth port 411f is connected to the fluid circuit $P_{19}$. The spool 412 has five lands 412a to 412e and is engaged at its opposite ends with the springs 413 and 414 to be held in the neutral position. Within the housing 410 a pair of pressure chambers 410a and 410b are formed at the opposite ends of the spool 412 and four annular chambers 410c to 410f are formed by the respective lands 412a to 412e of the spool 412. The annular chambers 410c and 410d are communicated to each other through a passage 412f and the annular chambers 410e and 410f are communicated to each other through a passage 412g.

In this speed ratio responsive valve 410, when the spool 412 is in the neutral position, the fluid circuit $P_{12}$ is communicated with the fluid circuit $P_{18}$ by way of the chamber 410c, the passage 412f and the chamber 410d and the fluid circuit $P_{11}$ is communicated with the fluid circuit $P_{19}$ by way of the chamber 410f, the passage 412g and the chamber 410e. In the case the low range clutch LC is engaged due to the line pressure applied to the fluid circuit $P_{17}$ from the fluid pump P by way of the low range clutch control valve 420 and the fluid circuit $P_2$, the spool 412 in the housing 411 is moved up by the line pressure applied into the lower pressure chamber 410b from the fluid circuit $P_{17}$, thereby to disconnect the respective fluid communications between the fluid circuits $P_{11}$ and $P_{19}$ and between the fluid circuits $P_{12}$ and $P_{18}$. Further, when the high range clutch HC is engaged due to the line pressure applied to the fluid circuit $P_{16}$ from the fluid pump P by way of the high range clutch control valve 430 and the fluid circuit $P_2$, the spool 412 is moved down by the line pressure applied into the upper pressure chamber 410a from the fluid circuit $P_{16}$, thereby to disconnect the respective fluid communications between the fluid circuits $P_{11}$ and $P_{19}$ and between the fluid circuits $P_{12}$ and $P_{18}$.

The low range clutch control valve 420 comprises a spool 422 reciprocable within a housing 421 and a pair of pistons 423 and 424 engageable with the opposite ends of the spool 422. The piston 423 is biased downward by a compression spring 426 and the piston 424 is engaged with the spool 422 by way of a spring 425. The housing 421 is provided thereon with eight ports 421a to 421h, inclusive. The first port 421a is connected to the fifth port 131e by way of the fluid circuit $P_{24}$, the second and fourth ports 421b and 421d are connected to the low range clutch LC by way of the fluid circuit $P_{17}$, the fifth port 421e is connected to the fluid pump P by way of the fluid circuit $P_2$, the sixth port 421f is connected to the high range clutch HC by way of the fluid circuit $P_{16}$, the eighth port 421h is connected to the fluid circuit $P_{18}$ through an orifice $O_4$ and a check valve $CV_4$ and the remaining ports 421c and 421g are connected to the reservoir Re. Within the housing 421, upper and lower pressure chambers 420d and 420c are formed by the pistons 424 and 423 respectively and annular chambers 420a and 420b are formed by lands 422a to 422c of the spool 422.

The high range clutch control valve 430 comprises a spool 432 reciprocable within a housing 431 and pistons 433 and 434 engageable with the opposite ends of the spool 432. The piston 433 is engaged with the lower end of the spool 432 by way of a spring 435 and a retainer 436. The housing 431 is provided thereon with eight ports 431a to 431h, inclusive. The first port 431a is connected by way of the fluid circuit $P_{24}$ to the fifth port 131e. The second and fourth ports 431b and 431d are connected by way of the fluid circuit $P_{16}$ to the high range clutch HC and to the sixth port 421f of the low range clutch control valve 420. The fifth port 431e is connected to the fluid pump P by way of the fluid circuit $P_2$, the sixth port 431f is connected by way of the fluid circuit $P_{17}$ to the low range clutch LC, the eighth port 431h is connected to the fluid circuit $P_{19}$ through an orifice $O_5$ and a check valve $CV_5$ and the remaining ports 431c and 431g are connected to the reservoir Re. Within the housing 431, upper and lower pressure chambers 430d and 430c are formed by the piston 434 and the piston 433 respectively and a pair of annular chambers 430a and 430b are formed by lands 432a to 432c of the spool 432.

In operation of the low and high range clutch control valves 420 and 430, under the inoperative condition of the hydromechanical transmission, the upper and lower pistons 424 and 423 of the control valve 420 are positioned in their upward and downward stroke ends due to respective biasing forces of the springs 425 and 426 so that the spool 422 is held in the downward position to connect the fluid circuit $P_2$ to the fluid circuit $P_{17}$, while the upper and lower pistons 434 and 433 of the control valve 430 are positioned in their upward and downward stroke ends due to biasing force of the spring 435 so that the spool 432 is held in the upward position to block the fluid communication between the fluid circuits $P_2$ and $P_{16}$. In this instance, the spool 132 of the speed ratio detecting valve 130 is in the upward position due to biasing force of the spring 133 to block the fluid communication between the fluid circuits $P_2$ and $P_{24}$, on the other hand the spool 412 of the speed ratio responsive valve 410 is in the neutral position due to biasing forces of the springs 413 and 414 to provide fluid communications between the fluid circuits $P_{11}$ and $P_{19}$ and between the fluid circuits $P_{12}$ and $P_{18}$. In such initial condition, when the line pressure is applied to the fluid circuit $P_2$ from the fluid pump P, the low range clutch LC is instantly engaged by the line pressure applied from the fluid circuit $P_2$ and the fluid circuit $P_{17}$ and simultaneously the spool 412 of the valve 410 is moved up by the line pressure applied into the lower pressure chamber 410b from the fluid circuit $P_{17}$ so as to block the fluid communications between the fluid circuits $P_{11}$ and $P_{19}$ and between the fluid circuits $P_{12}$ and $P_{18}$.

Subsequently, when the line pressure is applied into the respective upper pressure chambers 420d and 430d by way of the fluid circuit $P_2$ and the fluid circuit $P_{24}$ in response to the operation of the speed ratio detecting valve 130, only the upper piston 424 of the valve 420 is moved down against biasing of the spring 425, while the upper piston 434 and the spool 432 of the valve 430 are moved down against biasing of the spring 435 to connect the fluid circuit $P_2$ to the fluid circuit $P_{16}$. Thus, under the engagement of the low range clutch LC, the high range clutch HC is engaged due to the line pressure from the fluid circuit $P_{16}$. At the same time, the spool 412 of the valve 410 is moved to the neutral position due to the line pressure applied into the upper pressure chamber 410a from the fluid circuit $P_{16}$ to permit the fluid communications between the fluid circuits $P_{11}$ and $P_{19}$ and between the fluid circuits $P_{12}$ and $P_{18}$. As a result, the line pressure from the fluid circuit $P_{12}$ is applied to the lower pressure chamber 420c of the valve 420 by way of the orifice $O_4$ of the fluid circuit $P_{18}$, whereas the fluid circuit $P_{19}$ is connected to the reservoir Re by way of the fluid circuit $P_{11}$ and the speed responsive valve 70. Thereafter, when the pressure in the lower chamber 420c becomes the line pressure with a predetermined time lag defined by the orifice $O_4$, the lower piston 423 of the valve 420 is moved up against biasing of the spring 426 and, in turn, the spool 422 is moved up by engagement with the piston 423. This blocks the fluid communication between the fluid circuits $P_2$ and $P_{17}$ to disengage the low range clutch LC. In this instance, the spool 422 of the valve 420 is held in the upward position due to the line pressure applied to the annular chamber 420a from the fluid circuit $P_{16}$, whereas the spool 432 is held in the downward position due to the line pressure applied to an annular chamber 430e from the fluid circuit $P_{16}$. Moreover, the lower chamber 410b of the valve 410 is communicated to the reservoir Re by way of the fluid circuit $P_{17}$ and the control valve 420 so that the spool 412 of the valve 410 is moved down to block the fluid communications between the fluid circuits $P_{11}$ and $P_{19}$ and between the fluid circuits $P_{12}$ and $P_{18}$.

Furthermore, during the engagement of the high range clutch HC, when the line pressure is again applied to the respective upper pressure chambers 420d and 430d by way of the fluid circuit $P_{24}$ in response to the operation of the speed ratio detecting valve 130, the upper piston 424 and the spool 422 of the valve 420 are moved down to connect the fluid circuit $P_2$ to the fluid circuit $P_{17}$ so as to engage the low range clutch LC. At the same time, the spool 412 of the valve 410 is moved up to the neutral position due to the line pressure applied into the lower chamber 410b to permit the fluid communications between the fluid circuits $P_{11}$ and $P_{19}$ and between the fluid circuits $P_{12}$ and $P_{18}$. This applies the line pressure to the lower chamber 430c by way of the fluid circuit $P_{11}$ and the orifice $O_5$ of the fluid circuit $P_{19}$. Thereafter, when the pressure in the lower chamber 430c becomes the line pressure with a predetermined time lag defined by the orifice $O_5$, the piston 433 of the valve 430 is moved up against biasing of the spring 435 and, in turn, the spool 432 is moved up to block the fluid communication between the fluid circuits $P_2$ and $P_{16}$, thereby to disengage the high range clutch HC.

Figure 10:
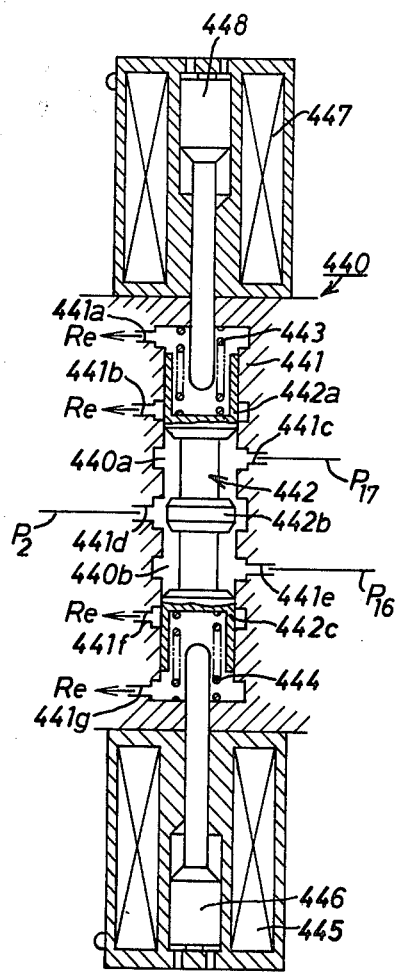
FIG. 10 illustrates an electrically operated valve corresponding with the low and high range clutch control valves shown in FIG. 9.
Figure 11:
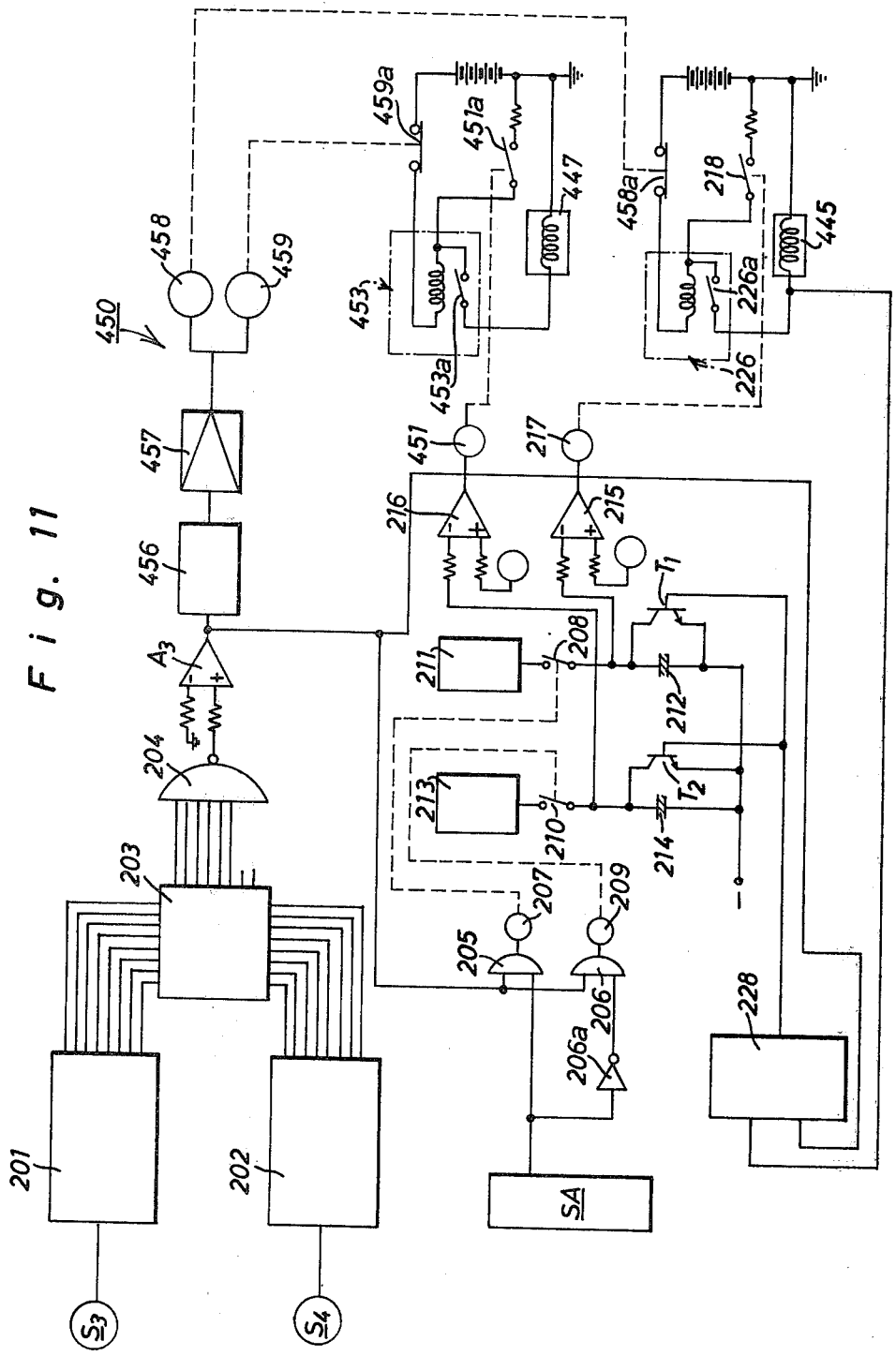
FIG. 11 illustrates an electric control system for controlling the electrically operated valve of FIG. 10.

Furthermore, in the above-mentioned modification, although the low and high range clutches LC and HC are controlled by the low and high range clutch control valves 420 and 430 which are operated in response to the operation of the speed ratio detecting valve 130 and the speed ratio responsive valve 410, these may be controlled by a solenoid valve 440, as shown in FIG. 10, which is operated by an electric control system 450, as shown in FIG. 11.

The solenoid valve 440 comprises a housing 441 with seven ports 441a to 441g, a spool 442 with three lands 442a to 442c, and a pair of compression springs 443 and 444 engaged with the opposite ends of the spool 442. In the solenoid valve 440, during deenergization of solenoids 445 and 447, the spool 442 is held in the neutral position due to biasing forces of the springs 443 and 444 such that the fluid circuit $P_2$ is connected to the fluid circuit $P_{17}$ through the fourth port 441d, an annular chamber 440a and the third port 441c and that the fluid circuit $P_2$ is connected to the fluid circuit $P_{16}$ through the fourth port 441d, an annular chamber 440b, and the fifth port 441e. Upon energization of the upper solenoid 447, the spool 442 is moved down by an upper plunger 448 against the lower spring 444. This results in continuous communication between the fluid circuits $P_2$ and $P_{17}$ and disconnection between the fluid circuits $P_2$ and $P_{16}$. Upon energization of the lower solenoid 445, the spool 442 is moved up by a lower plunger 446 against the upper spring 443. This results in continuous communication between the fluid circuits $P_2$ and $P_{16}$ and disconnection between the fluid circuits $P_2$ and $P_{17}$.

In the electric control system 450, the electric control system 200 shown in FIG. 6 is adapted to selectively energize the upper and lower solenoids 447 and 445 of the valve 440. In FIG. 11, a pair of reed relays 458 and 459 is connected to the output terminal of the amplifier $A_3$ by way of a trigger circuit 456 and an amplifier 457. The reed relay 458 functions to temporarily open a normally close contact 458a disposed within a self-holding circuit for the solenoid 445, as described hereinafter. The reed relay 459 functions to temporarily open a normally close contact 459a disposed within a self-holding circuit for the solenoid 447, as also described hereinafter. In the self-holding circuit for the solenoid 447, a reed relay 451 for a normally open contact 451a is connected to the output terminal of the comparator 216 and an electromagnetic relay 453 is connected to a timing circuit (not shown in the figure) which is connected to the prime battery across an ignition switch of the vehicle.

With this electric control system 450, when the ignition switch is actuated, the electromagnetic relay 453 is energized by the timing circuit in a predetermined short period of time to close a normally open contact 453a so as to energize the upper solenoid 447. Thus, the spool 442 of the valve 440 is moved down by the upper plunger 448 against the lower spring 444. This results in the continuous communication between the fluid circuits $P_2$ and $P_{17}$ and the disconnection between the fluid circuits $P_{16}$ and $P_2$. Under this condition, when the line pressure is applied to the fluid circuit $P_2$ from the fluid pump P, the low range clutch LC is instantly engaged by the line pressure applied from the fluid circuits $P_2$ and $P_{17}$.

Subsequently, when a high level output signal is issued from the NOR circuit 204, the reed relays 458 and 459 are energized to temporarily open the respective contacts 458a and 459a in response to operation of the trigger circuit 456 so that the electromagnetic relay 453 is deenergized to open the contact 453a. This deenergizes the upper solenoid 447 to return the spool 442 to the neutral position due to biasing force of the lower spring 444. Thus, the fluid circuit $P_2$ is connected again to the fluid circuit $P_{16}$ to engage the high range clutch HC under the engagement of the low range clutch LC. On the other hand, the AND circuit 205 receives the high level output signal from the NOR circuit 204 and a positive voltage generated in the servo-amplifier SA so that the reed relay 207 is energized to close the contact 208.

Upon closing of the contact 208, the power source 211 charges the capacitor 212, of which charged voltage is applied to the comparator 215. When the charged voltage of the capacitor 212 rises up to predetermined value due to the continuous closure of the contact 208, the comparator 215 drives the reed relay 217 to close the contact 218. This energizes the electromagnetic relay 226 to close the contact 226a so as to energize the lower solenoid 445 of the solenoid valve 440. Thus, the spool 442 is moved up by the lower plunger 446 against the upper spring 443. This results in the communication between the fluid circuits $P_2$ and $P_{16}$ and the disconnection between the fluid circuits $P_2$ and $P_{17}$. Then, the high range clutch HC is continuously engaged and the low range clutch LC is disengaged. After energization of the lower solenoid 445, the trigger circuit 228 functions to turn on the transistors $T_1$ and $T_2$ so as to instantly discharge the capacitor 212. Thereafter, the reed relay 217 is deenergized to open the contact 218, but the relay 226 is energized by closing of the contact 226a to maintain the energization of the solenoid 445.

When a high level output signal is again issued from the NOR circuit 204 after the engagement of the high range clutch HC, the reed relays 458 and 459 are energized to temporarily open the respective contacts 458a and 459a in response to the operation of the trigger circuit 456 so that the relay 226 is deenergized to open the contact 226a. This deenergizes the lower solenoid 445 to return the spool 442 to the neutral position due to biasing force of the upper spring 443. Thus, the fluid circuit $P_2$ is connected to the fluid circuit $P_{17}$ to engage the low range clutch LC under the engagement of the high range clutch HC. On the other hand, the AND circuit 206 receives the high level output signal from the NOR circuit 204 and a negative voltage generated in the servo-amplifier SA such that the reed relay 209 is energized to close the contact 210.

Upon closing of the contact 210, the power source 213 charges the capacitor 214, of which charged voltage is applied to the comparator 216. When the charged voltage of the capacitor 214 rises up to the predetermined value due to the continuous closure of the contact 210, the comparator 216 drives the reed relay 451 to close the contact 451a. Thus, the relay 453 is energized to close the contact 453a so as to energize the upper solenoid 447 of the valve 440. Then, the spool 442 is moved down by the upper plunger 448 against the lower spring 444. This results in the communication between the fluid circuits $P_2$ and $P_{17}$ and the disconnection between the fluid circuits $P_2$ and $P_{16}$. Thus, the low range clutch LC is continuously engaged and the high range clutch HC is disengaged. In this instance, when the high level output signal does not appear at the NOR circuit 204 after the energization of the upper solenoid 447, the trigger circuit 228 functions to turn on the transistors $T_1$ and $T_2$ so as to instantly discharge the capacitor 214. Thereafter, the reed relay 451 is deenergized to open the contact 451a, but the relay 453 is energized by closing of the contact 453a to maintain the energization of the solenoid 447.

Although in the above-mentioned embodiment and modifications the present invention is applied to an output split type hydromechanical transmission, the present invention may as well be applied to an input split type hydromechanical transmission and other type transmissions.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a hydromechanical transmission comprising:

an input shaft (2);
an output shaft (10);
a hydraulically controlled differential gear unit ($D_1$, $D_2$) for selectively providing low and high speed drive power trains between said input and output shafts;
a first positive displacement pump-motor ($M_1$) drivingly connected to one of said input and output shafts;
a second positive displacement pump-motor ($M_2$) hydraulically connected with said first pump-motor ($M_1$);
clutch means (LC, HC) for switching over said low speed drive power train to and from said high speed drive power train when an actual speed ratio of said output shaft to said input shaft reaches a predetermined speed ratio (e*);
a fluid actuator (AC) for varying the displacement capacity of one of said pump-motors to control the actual speed ratio; and
a speed responsive valve (70) for controlling fluid pressure applied to said actuator from a source of fluid pressure (P) in accordance with a first signal responsive to a throttle opening angle and a second signal responsive to the rotational speed of said input shaft;

the improvement comprising:
speed ratio detecting means (100) for detecting changes of the actual speed ratio to generate a first shift signal when the actual speed ratio increases to a first value ($e_1$*) slightly lower than the predetermined speed ratio (e*) and a second shift signal when the actual speed ratio decreases to a second value ($e_2$*) slightly higher than the predetermined speed ratio (e*);
clutch control means (120) for activating said clutch means (LC, HC) in response to either the first or second shift signal from said speed ratio detecting means; and
means for delaying each of the first and second shift signals applied to said clutch control means from said speed ratio detecting means to prevent activation of said clutch means immediately after increasing or decreasing of the actual speed ratio to the first value or the second value.

2. A hydromechanical transmission as claimed in claim 1, wherein said speed ratio detecting means comprises a first hydraulically operated valve (100) for detecting a difference between governor pressures respectively indicative of rotational speeds of said input and output shafts, said hydraulically operated valve providing a first fluid communication between said source of fluid pressure and said clutch control means when the pressure difference corresponds with a first value ($e_1$*) slightly lower than the predetermined speed ratio (e*) and providing a second fluid communication between said source of fluid pressure and said clutch control means when the pressure difference corresponds with a second value ($e_2$*) slightly higher than the predetermined speed ratio (e*), and wherein said clutch control means comprises a second hydraulically operated valve (120) for activating said clutch means in response to the fluid pressure applied thereto through either the first or second fluid communication.

3. A hydromechanical transmission as claimed in claim 2, wherein said means for delaying each of the first and second shift signals comprises flow regulating means ($O_2$, $O_3$) for throttling the flow of pressurized fluid applied to said second hydraulically operated valve through either the first or second fluid communication.

* * * * *

UNITED STATES PATENT AND TRADEMARK OFFICE
CERTIFICATE OF CORRECTION

PATENT NO. : 4,170,153

DATED : October 9, 1979

INVENTOR(S) : Kiyohumi Mizuno Et Al

It is certified that error appears in the above-identified patent and that said Letters Patent are hereby corrected as shown below:

Please correct the priority data to appears as follows:
--May 28, 1976 Japan ... 51-62597--.  Also please insert the following inventor --Tsukasa Watanabe--.

Signed and Sealed this

First Day of January 1980

[SEAL]

Attest:

SIDNEY A. DIAMOND

*Attesting Officer*   *Commissioner of Patents and Trademarks*